(12) United States Patent
Torisaki et al.

(10) Patent No.: US 7,457,891 B2
(45) Date of Patent: Nov. 25, 2008

(54) DMA CONTROLLER CONNECTED TO MASTER AND SLAVE DEVICE WHEREIN A RANK IS USED FOR JUDGING DATA TRANSFER PERMISSIBILITY

(75) Inventors: Yuishi Torisaki, Takarazuka (JP); Makoto Fujiwara, Kyoto (JP); Yusuke Nemoto, Kobe (JP)

(73) Assignee: Panasonic Corporation, Osaka (JP)

( * ) Notice: Subject to any disclaimer, the term of this patent is extended or adjusted under 35 U.S.C. 154(b) by 336 days.

(21) Appl. No.: 11/359,866

(22) Filed: Feb. 23, 2006

(65) Prior Publication Data

US 2006/0206634 A1  Sep. 14, 2006

(30) Foreign Application Priority Data

Feb. 24, 2005 (JP) .............................. 2005-049398

(51) Int. Cl.
*G06F 13/28* (2006.01)
(52) U.S. Cl. .................. 710/22; 710/8; 710/9; 710/23; 710/110
(58) Field of Classification Search ............... 710/8–10, 710/23, 22, 110
See application file for complete search history.

(56) References Cited

U.S. PATENT DOCUMENTS

| 6,772,254 B2 * | 8/2004 | Hofmann et al. ............. 710/110 |
| 7,139,909 B2 * | 11/2006 | Lee ............................. 713/100 |
| 7,246,185 B1 * | 7/2007 | Pritchard et al. ............. 710/110 |

FOREIGN PATENT DOCUMENTS

JP   2001-297054   10/2001

* cited by examiner

*Primary Examiner*—Tammara Peyton
(74) *Attorney, Agent, or Firm*—McDermott Will & Emery LLP

(57) ABSTRACT

A DMA controller is connected by a bus to a plurality of master devices and a plurality of slave devices, and performs a data transfer between slave devices which are specified as a source and a destination of the data transfer by a transfer condition received from any of the plurality of master devices. Each of the plurality of master devices and the plurality of slave devices has a rank used for judging data transfer permissibility. The DMA controller enables the data transfer if the data transfer is judged to be permitted as a result of a comparison between a rank of the master device and a rank of any of the specified slave devices, and disables the data transfer if the data transfer is judged to be prohibited.

26 Claims, 27 Drawing Sheets

FIG. 4

| TRANSFER SOURCE | | TRANSFER DESTINATION | | TRANSFER SOURCE RANK | TRANSFER DESTINATION RANK |
|---|---|---|---|---|---|
| SLAVE DEVICE NAME | ADDRESS RANGE | SLAVE DEVICE NAME | ADDRESS RANGE | | |
| GENERAL STORAGE DEVICE | 0x0000 — 0x00FF | ENCRYPTION DEVICE | 0x0100 — 0x01FF | 1 | 2 |
| ENCRYPTION DEVICE | 0x0100 — 0x01FF | GENERAL STORAGE DEVICE | 0x0000 — 0x00FF | 2 | 1 |
| GENERAL STORAGE DEVICE | 0x0000 — 0x00FF | SECRET INFORMATION STORAGE DEVICE | 0x0200 — 0x02FF | 1 | 3 |
| ENCRYPTION DEVICE | 0x0100 — 0x01FF | SECRET INFORMATION STORAGE DEVICE | 0x0200 — 0x02FF | 2 | 3 |
| SECRET INFORMATION STORAGE DEVICE | 0x0200 — 0x02FF | GENERAL STORAGE DEVICE | 0x0000 — 0x00FF | 3 | 1 |
| SECRET INFORMATION STORAGE DEVICE | 0x0200 — 0x02FF | ENCRYPTION DEVICE | 0x0100 — 0x01FF | 3 | 2 |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |

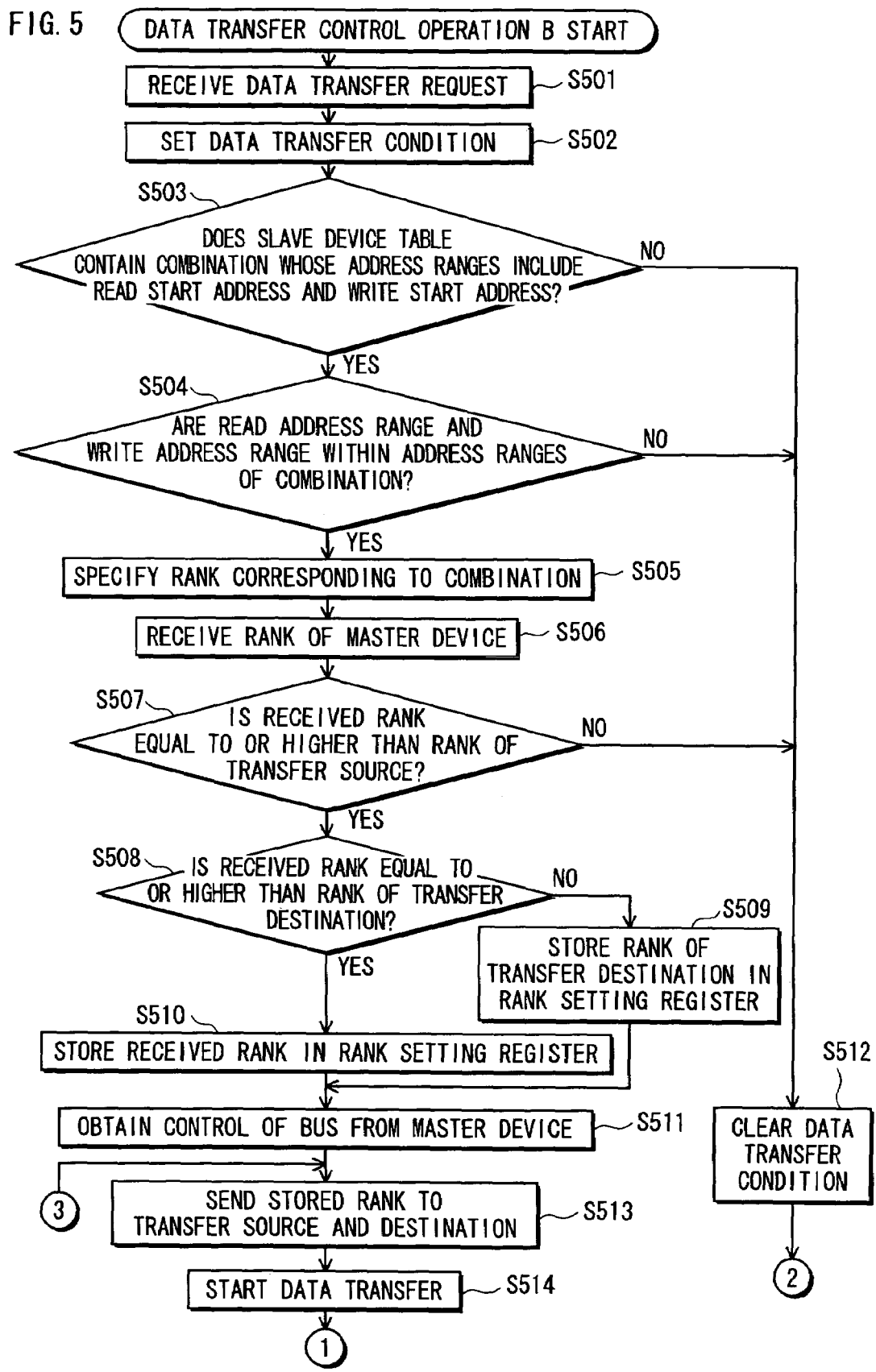

US 7,457,891 B2

DMA CONTROLLER CONNECTED TO MASTER AND SLAVE DEVICE WHEREIN A RANK IS USED FOR JUDGING DATA TRANSFER PERMISSIBILITY

This application is based on an application No. 2005-142570 filed in Japan, the contents of which are hereby incorporated by reference.

BACKGROUND OF THE INVENTION

1. Field of the Invention

The present invention relates to data transfer control techniques for ensuring security when performing data transfers between devices using a DMA (Direct Memory Access) controller in a secret information processing apparatus.

2. Related Art

A DMA controller performs data transfers between devices, instead of a CPU. The CPU requests the DMA controller to perform a data transfer of a heavy load. This enables the CPU to execute other tasks while the DMA controller is performing the data transfer.

The DMA controller performs a data transfer based on source and destination addresses given from the CPU. This being so, if noise or the like occurs in address signals, the DMA controller may fail to recognize correct addresses and transfer data to wrong addresses. As a result, important data stored in a device to which the data has been wrongly transferred may be lost or destroyed by overwriting.

To prevent such an incorrect data transfer by the DMA controller, the following technique is conventionally disclosed in Japanese Patent Application Publication No. 2001-297054.

In a secret information processing apparatus, a DMA controller reads data stored in a storage area of one address and transfers the read data to a storage area of another address, in accordance with address-related data stored in registers used for a data transfer between devices. This DMA controller includes a table which shows an effective address range assigned to each individual device, and a monitor unit which stops the data transfer when an address shown by address-related data stored in the registers deviates from the effective address range in the table.

According to this technique, when an error occurs in the address-related data due to noise or the like, the data transfer is stopped. This prevents failures such as reading data from an address to which a memory is not allocated, writing data to an address intended for another purpose, or transferring data of a completely different size.

In cases where the level of secrecy differs between devices, however, the above conventional technique has the following problem. Take a secret information processing apparatus in which only a specific CPU is authorized to access a device having a particularly high level of secrecy, for example. Even if a data transfer to or from this device is requested by a CPU other than the specific CPU, the DMA controller of the conventional technique performs the data transfer, so long as an address range assigned to the device is not deviated.

SUMMARY OF THE INVENTION

The present invention aims to provide a DMA controller that can, even in a secret information processing apparatus in which the level of secrecy differs between devices, perform a data transfer in response to a data transfer request while effectively preventing leakage of secret information.

The stated aim can be achieved by a DMA controller connected by a bus to a master device and a plurality of slave devices, and for performing a data transfer between slave devices which are specified, from among the plurality of slave devices, as a source and a destination of the data transfer by a transfer condition received from the master device, each of the master device and the plurality of slave devices having a rank used for judging data transfer permissibility, the DMA controller including a data transfer control unit operable to enable the data transfer if the data transfer is judged to be permitted as a result of a comparison between a rank of the master device and a rank of any of the specified slave devices, and disable the data transfer if the data transfer is judged to be prohibited.

Here, each of the specified slave devices may judge whether to permit access to the slave device, based on a result of a comparison between the rank of the master device received from the DMA controller and a rank of the slave device, wherein the data transfer control unit includes: a request unit operable to send the rank of the master device to the slave device, to request access to the slave device; and a transfer permissibility judgment unit operable to judge whether the data transfer is permitted or prohibited, based on a result of the judgment by the slave device.

The stated aim can also be achieved by a data transfer control method used in a DMA controller that is connected by a bus to a master device and a plurality of slave devices and is for performing a data transfer between slave devices which are specified, from among the plurality of slave devices, as a source and a destination of the data transfer by a transfer condition received from the master device, the master device and the plurality of slave devices each having a rank used for judging accessibility, each of the specified slave devices judging whether to permit access to the slave device based on a result of a comparison between a rank of the master device and a rank of the slave device, and the DMA controller including a condition storage unit, the data transfer control method including the steps of: storing the transfer condition in the condition storage unit; instructing the master device to send the rank of the master device to the slave device, to request access to the slave device; and enabling the data transfer if the slave device permits access to the slave device.

The stated aim can also be achieved by a data transfer control method used in a DMA controller that is connected by a bus to a master device and a plurality of slave devices and is for performing a data transfer between slave devices which are specified, from among the plurality of slave devices, as a source and a destination of the data transfer by a transfer condition received from the master device, the master device and the plurality of slave devices each having a rank used for judging data transfer permissibility, and each of the specified slave devices judging whether to permit access to the slave device based on a result of a comparison between a rank of the master device and a rank of the slave device, the data transfer control method including the steps of: sending the rank of the master device to the slave device, to request access to the slave device; and judging whether the data transfer is permitted or prohibited based on a result of the judgment by the slave device, and enabling the data transfer if the data transfer is judged to be permitted and disabling the data transfer if the data transfer is judged to be prohibited.

According to the above constructions, the data transfer permissibility is judged based on the result of the comparison between the rank of the master device which has requested the data transfer and the rank of any of the slave devices which are specified as the source and the destination of the data transfer. This effectively prevents leakage of secret information caused by performing a data transfer without restriction irrespective of which master device has requested the data transfer.

Here, the data transfer control unit may include: a table storage unit storing a slave device table showing, for each possible combination of slave devices as a source and a destination of a data transfer, a higher one of ranks of the slave devices; a comparison unit operable to compare the rank of the master device with a rank corresponding to a combination of the specified slave devices in the slave device table; and a transfer permissibility judgment unit operable to judge whether the data transfer is permitted or prohibited, based on a result of the comparison by the comparison unit.

According to this construction, the DMA controller can promptly judge the data transfer permissibility, with it being possible to improve the efficiency of the overall data transfer control operation.

Here, the data transfer control unit may further include a table judgment unit operable to judge whether the combination of the specified slave devices is included in the slave device table, wherein the transfer permissibility judgment unit judges the data transfer to be prohibited, if the combination of the specified slave devices is not included in the slave device table.

According to this construction, a data transfer between slave devices which are not included in the slave device table is suppressed. Hence an unauthorized data transfer between data storage areas which are not available for data transfers can be effectively prevented.

Here, the data transfer control unit may include: an acquisition unit operable to acquire a rank of each of the specified slave devices, from the slave device; a comparison unit operable to compare the rank of the master device with the acquired rank; and a transfer permissibility judgment unit operable to judge whether the data transfer is permitted or prohibited, based on a result of the comparison by the comparison unit.

According to this construction, the DMA controller acquires the rank of each of the specified slave devices directly from the slave device and compares it with the rank of the master device. This enables the DMA controller to promptly judge the data transfer permissibility. Hence the overall data transfer control operation can be conducted efficiently even when the rank of the slave device is variable.

Here, each of the specified slave devices may judge whether to permit access to the slave device, based on a result of a comparison between the rank of the master device received from the DMA controller and a rank of the slave device, wherein the data transfer control unit further includes a request unit operable to send the rank of the master device to the slave device, to request access to the slave device, and the transfer permissibility judgment unit judges whether the data transfer is permitted or prohibited, based on the result of the comparison by the comparison unit and a result of the judgment by the slave device.

According to this construction, the data transfer is enabled only when the slave devices permit access. As a result, an unauthorized data transfer can be prevented effectively.

Here, the DMA controller may be connected by the bus to a plurality of master devices including the master device, wherein the data transfer control unit includes: a flag storage unit storing a flag that shows a state of the DMA controller as any of a data transferable state and a data intransferable state; and a flag setting unit operable to set the flag to show the data intransferable state during data transferring, and to show the data transferable state not during data transferring, and the data transfer control unit disables the data transfer, if the flag shows the data intransferable state upon receiving the transfer condition from the master device.

According to this construction, while a data transfer requested by one master device is being performed, a data transfer requested by another master device is prohibited. This suppresses an unauthorized data transfer by another master device while data is being transferred.

Here, the data transfer control unit may further include: a master device storage unit operable to, if the transfer condition is received from the master device while the flag shows the data transferable state, store an identifier of the master device; and a master device judgment unit operable to, if the transfer condition is received from the master device while the flag shows the data intransferable state, judge whether the identifier of the master device is stored in the master device storage unit, wherein the data transfer control unit disables the data transfer, if the flag shows the data intransferable state upon receiving the transfer condition from the master device and the identifier of the master device is not stored in the master device storage unit.

According to this construction, when the DMA controller is performing a data transfer requested by one master device, the same master device can request another data transfer, so that the DMA controller performs the two data transfers in parallel. This enhances the data transfer efficiency of the DMA controller.

Here, the DMA controller may be connected by the bus to a plurality of master devices including the master device, wherein the data transfer control unit includes: an interrupt request reception unit operable to, when a transfer interrupt request is sent from any of the plurality of master devices and the plurality of slave devices during the data transfer, receive the transfer interrupt request; a requester judgment unit operable to judge whether a sender of the transfer interrupt request is one of the plurality of master devices; an interrupt judgment unit operable to, if the sender of the transfer interrupt request is one of the plurality of master devices, receive a rank of the sender of the transfer interrupt request, and judge whether to stop the data transfer, based on a result of a comparison between the rank of the sender of the transfer interrupt request and the rank of the master device; and a transfer stop unit operable to stop the data transfer if the interrupt judgment unit judges that the data transfer is to be stopped.

According to this construction, the judgment as to whether the data transfer is to be stopped is made based on the result of the comparison between the rank of the master device which has requested the data transfer and the rank of the master device which has requested the transfer interrupt. This effectively prevents a data transfer from being interrupted without restriction.

Here, the DMA controller may further include: a lower rank limit storage unit storing a predetermined lower rank limit; a rank storage unit operable to receive the rank of the master device from the master device, and store the received rank; and a condition storage unit operable to store the transfer condition, wherein the data transfer is judged to be permitted if the rank stored in the rank storage unit is no lower than the rank of any of the specified slave devices, and judged to be prohibited if the rank stored in the rank storage unit is lower than the rank of any of the specified slave devices, the interrupt judgment unit judges that the data transfer is to be stopped, if the rank of the sender of the transfer interrupt request is no lower than the rank stored in the rank storage unit, and the data transfer control unit further includes: an erase unit operable to erase the transfer condition in the condition storage unit, if the interrupt judgment unit judges that the data transfer is to be stopped; and a replace unit operable to replace the rank in the rank storage unit with the lower rank limit, if the interrupt judgment unit judges that the data transfer is to be stopped.

According to this construction, when the data transfer is judged to be stopped, the transfer condition stored in the condition storage unit is erased and the rank stored in the rank storage unit is replaced with the lower rank limit. This effectively prevents unauthorized use of the transfer condition used during the data transfer.

Here, the data transfer may be judged to be permitted if the rank of the master device is no lower than the rank of any of the specified slave devices, and judged to be prohibited if the rank of the master device is lower than the rank of any of the specified slave devices, wherein the data transfer control unit includes: an upper rank limit storage unit storing a predetermined upper rank limit; and a comparison unit operable to compare the rank of the master device with the upper rank limit, and the data transfer control unit enables the data transfer, if the rank of the master device is no higher than the upper rank limit and the data transfer is judged to be permitted, or if the rank of the master device is higher than the upper rank limit and the upper rank limit is no lower than the rank of any of the specified slave devices.

According to this construction, if the rank of the master device which has requested the data transfer is too high, the upper rank limit is used instead of the rank of the master device. This effectively prevents an unauthorized data transfer using a false rank.

Here, the DMA controller may be connected by the bus to a plurality of master devices including the master device, wherein the data transfer control unit further includes a rank storage unit operable to store the rank of the master device if the rank of the master device is no higher than the upper rank limit, and store the upper rank limit if the rank of the master device is higher than the upper rank limit, and the data transfer control unit disables a data transfer requested by any master device whose rank is lower than the rank stored in the rank storage unit.

According to this construction, a data transfer requested by a master device having a low rank is denied, with it being possible to limit master devices that can have the DMA controller perform data transfers.

Here, the data transfer control unit may further include: an interrupt request reception unit operable to, when a transfer interrupt request is sent from any of the plurality of master devices and the plurality of slave devices during the data transfer, receive the transfer interrupt request; a requester judgment unit operable to judge whether a sender of the transfer interrupt request is one of the plurality of master devices; an interrupt judgment unit operable to, if the sender of the transfer interrupt request is one of the plurality of master devices, receive a rank of the sender of the transfer interrupt request, and judge whether to stop the data transfer, based on a result of a comparison between the rank of the sender of the transfer interrupt request and the rank stored in the rank storage unit; and a transfer stop unit operable to stop the data transfer if the interrupt judgment unit judges that the data transfer is to be stopped.

According to this construction, the judgment as to whether the data transfer is to be stopped is made based on the result of the comparison between the rank of the device which has requested the transfer interrupt and the rank stored in the rank storage unit. This effectively prevents a data transfer from being interrupted without restriction.

Here, the DMA controller may further include a condition storage unit operable to store the transfer condition, wherein the interrupt judgment unit judges that the data transfer is to be stopped, if the rank of the sender of the transfer interrupt request is no lower than the rank stored in the rank storage unit, and the data transfer control unit further includes: an erase unit operable to erase the transfer condition in the condition storage unit, if the interrupt judgment unit judges that the data transfer is to be stopped; and a replace unit operable to replace the rank in the rank storage unit with the upper rank limit, if the interrupt judgment unit judges that the data transfer is to be stopped.

According to this construction, the data transfer is stopped only if the rank of the master device which has requested the transfer interrupt is no lower than the rank stored in the rank storage unit. After the transfer interrupt, a data transfer requested by a master device whose rank is lower than the upper rank limit is denied. This effectively prevents an unauthorized transfer interrupt and an unauthorized data transfer after the transfer interrupt.

Here, the DMA controller may further include a lower rank limit storage unit storing a lower rank limit which is no higher than a rank of any of the plurality of master devices and the plurality of slave devices, wherein the erase unit erases the transfer condition in the condition storage unit, when the data transfer is completed, and the replace unit replaces the rank in the rank storage unit with the lower rank limit, when the data transfer is completed.

According to this construction, the transfer condition is erased once the data transfer has been completed. This effectively prevents unauthorized use of the transfer condition used during the data transfer.

Here, each of the specified slave devices may permit access to the slave device, if a rank received from the DMA controller is no lower than a rank of the slave device, wherein the data transfer control unit further includes: a rank storage unit storing an upper rank limit which is no lower than a rank of any of the plurality of slave devices; a condition storage unit operable to store the transfer condition; and a request unit operable to send the upper rank limit to the slave device, to request access to the slave device, and the transfer permissibility judgment unit judges whether the data transfer is permitted or prohibited, based on the result of the comparison by the comparison unit and if the slave device permits access to the slave device.

According to this construction, there is no need for the DMA controller to store, each time a data transfer is requested by a master device, a rank of the master device to obtain access permission from slave devices specified by the master device. This eases the process of obtaining access permission from the slave devices to execute the data transfer.

Here, the DMA controller may be connected by the bus to a plurality of master devices including the master device, wherein the data transfer control unit further includes: an interrupt request reception unit operable to, when a transfer interrupt request is sent from any of the plurality of master devices and the plurality of slave devices during the data transfer, receive the transfer interrupt request; a requester judgment unit operable to judge whether a sender of the transfer interrupt request is one of the plurality of master devices; an interrupt judgment unit operable to, if the sender of the transfer interrupt request is one of the plurality of master devices, receive a rank of the sender of the transfer interrupt request, and judge whether to stop the data transfer, based on a result of a comparison between the rank of the sender of the transfer interrupt request and the upper rank limit stored in the rank storage unit; and a transfer stop unit operable to stop the data transfer, if the interrupt judgment unit judges that the data transfer is to be stopped.

According to this construction, the judgment as to whether the data transfer is to be stopped is made based on the result of the comparison between the rank of the master device which has requested the transfer interrupt and the upper rank limit. This effectively prevents a data transfer from being interrupted without restriction.

Here, the data transfer control unit may further include an erase unit operable to erase the transfer condition in the condition storage unit, if the interrupt judgment unit judges that the data transfer is to be stopped.

According to this construction, the transfer condition is erased when the data transfer is judged to be stopped. This effectively prevents unauthorized use of the transfer condition used during the data transfer.

Here, the data transfer control unit may include: an authentication unit operable to perform authentication on the master device, in response to an authentication request from the master device; and a lower rank limit storage unit storing a lower rank limit which is no higher than a rank of any of the master device and the plurality of slave devices, wherein the data transfer control unit enables the data transfer, if the authentication is successful and the data transfer is judged to be permitted, or if the authentication is unsuccessful and the lower rank limit is no lower than the rank of any of the specified slave devices.

According to this construction, the data transfer permissibility is judged based on the rank of the master device if the authentication of the master device is successful, and based on the lower rank limit if the authentication of the master device is unsuccessful. In this way, the confidentiality can be enhanced without decreasing the data transfer efficiency of the DMA controller.

Here, the DMA controller may be connected by the bus to a plurality of master devices including the master device, wherein the DMA controller further includes a rank storage unit operable to store the rank of the master device if the authentication is successful, and store the lower rank limit if the authentication is unsuccessful, and the data transfer control unit further includes: an interrupt request reception unit operable to, when a transfer interrupt request is sent from any of the plurality of master devices and the plurality of slave devices during the data transfer, receive the transfer interrupt request; a requester judgment unit operable to judge whether a sender of the transfer interrupt request is one of the plurality of master devices; an interrupt judgment unit operable to, if the sender of the transfer interrupt request is one of the plurality of master devices, receive a rank of the sender of the transfer interrupt request, and judge whether to stop the data transfer, based on a result of a comparison between the rank of the sender of the transfer interrupt request and the rank stored in the rank storage unit; and a transfer stop unit operable to stop the data transfer if the interrupt judgment unit judges that the data transfer is to be stopped.

According to this construction, the judgment as to whether the data transfer is to be stopped is made based on the result of the comparison between the rank of the master device which has requested the transfer interrupt and the rank stored in the rank storage unit. This effectively prevents a data transfer from being interrupted without restriction.

Here, the DMA controller may further include a condition storage unit operable to store the transfer condition, wherein the data transfer is judged to be permitted if the rank stored in the rank storage unit is no lower than the rank of any of the specified slave devices, and judged to be prohibited if the rank stored in the rank storage unit is lower than the rank of any of the specified slave devices, the interrupt judgment unit judges that the data transfer is to be stopped, if the rank of the sender of the transfer interrupt request is no lower than the rank stored in the rank storage unit, and the data transfer control unit further includes: an erase unit operable to erase the transfer condition in the condition storage unit, if the interrupt judgment unit judges that the data transfer is to be stopped; and a replace unit operable to replace the rank in the rank storage unit with the lower rank limit, if the interrupt judgment unit judges that the data transfer is to be stopped.

According to this construction, when the data transfer is judged to be stopped, the transfer condition stored in the condition storage unit is erased and the rank stored in the rank storage unit is replaced with the lower rank limit. This effectively prevents unauthorized use of the transfer condition used during the data transfer.

Here, the data transfer control unit may include: a table storage unit storing a slave device table showing, for each possible combination of slave devices as a source and a destination of a data transfer, ranks of the slave devices; a comparison unit operable to compare the rank of the master device with each rank corresponding to a combination of the specified slave devices in the slave device table; and a transfer permissibility judgment unit operable to judge whether the data transfer is permitted or prohibited, based on a result of the comparison by the comparison unit.

According to this construction, the DMA controller can promptly judge the data transfer permissibility, with it being possible to improve the efficiency of the overall data transfer control operation.

Also, the data transfer control operation can be conducted accurately according to the ranks of both the source and destination slave devices.

The stated aim can also be achieved by a DMA controller connected by a bus to a master device and a plurality of slave devices, and for performing a data transfer between slave devices which are specified, from among the plurality of slave devices, as a source and a destination of the data transfer by a transfer condition received from the master device, the DMA controller including: an authentication unit operable to perform authentication on the master device, in response to an authentication request from the master device; and a data transfer control unit operable to enable the data transfer if the authentication is successful.

According to this construction, if the authentication of the master device is unsuccessful, the data transfer requested by the master device is denied. In this way, the confidentiality in data transfer by the DMA controller can be enhanced.

Here, the DMA controller may further include an invalid master device storage unit operable to store an identifier of the master device, if the authentication is unsuccessful, wherein the authentication unit performs the authentication, if the identifier of the master device is not stored in the invalid master device storage unit.

According to this construction, the master device is listed in the invalid master device storage unit if it has failed to be authenticated. Once listed, an authentication request from that master device is ignored. This saves a processing load required for unnecessary authentication.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 4 shows a specific example of a slave device table;

FIG. 5 is a flowchart showing one part of a data transfer control operation B performed by a DMA controller shown in FIG. 3, in the second embodiment;

DESCRIPTION OF THE PREFERRED EMBODIMENT(S)

The following describes a best mode for carrying out the present invention, with reference to the drawings.

First Embodiment

<Construction>

Figure 1:
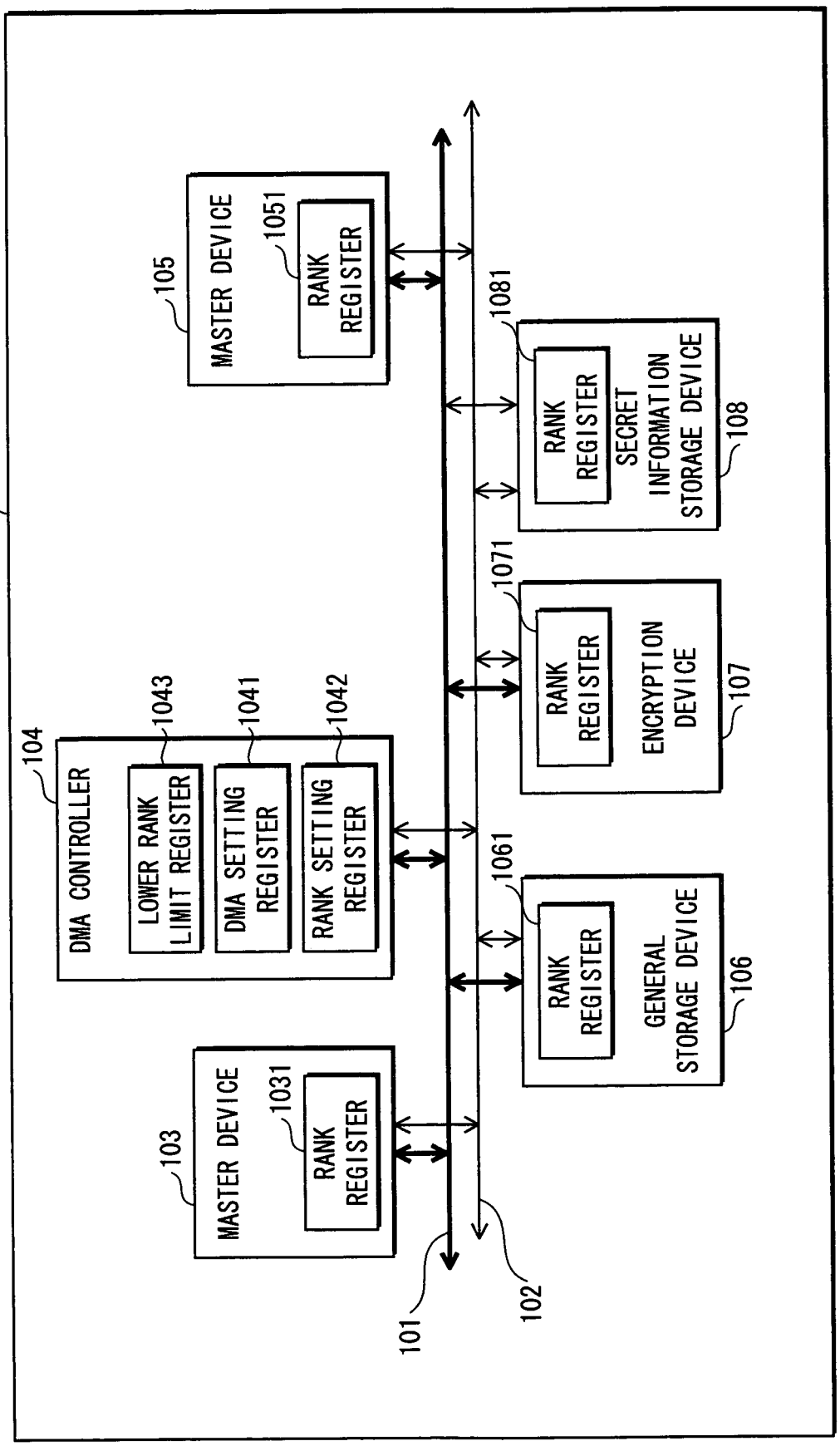
FIG. 1 is a functional block diagram showing a construction of a secret information processing apparatus to which a first embodiment of the present invention relates.

FIG. 1 is a functional block diagram showing a construction of a secret information processing apparatus 100 to which a first embodiment of the present invention relates.

As shown in the drawing, the secret information processing apparatus 100 is roughly made up of devices that include a data/address bus 101, a rank bus 102, a master device 103, a DMA controller 104, a master device 105, a general storage device 106, an encryption device 107, and a secret information storage device 108.

Note here that the secret information processing apparatus 100 may be connected to an external device via an external interface.

The data/address bus 101 is used for transferring data and addresses.

The rank bus 102 is used for transferring ranks.

A rank referred to here is information which is used when judging whether access to a device in the secret information processing apparatus 100 is permitted or not, that is, whether a data transfer to or from the device is permitted or not. A rank is set in advance for each device in the secret information processing apparatus 100 except the DMA controller 104. In this embodiment and the embodiments that follow, a rank is expressed by a number, with a larger number denoting a higher rank.

The master devices 103 and 105 are each a control device which is roughly composed of a CPU, a DSP (Digital Signal Processor), and a rank register. The master devices 103 and 105 store their ranks in rank registers 1031 and 1051, respectively.

Each of the master devices 103 and 105 requests the DMA controller 104 to perform a data transfer between devices, by sending a data transfer request to the DMA controller 104.

The data transfer request referred to here contains, as a data transfer condition, an identifier of the master device, a read start address in a data storage area of a device which is a source of the data transfer, a write start address in a data storage area of a device which is a destination of the data transfer, and a size of data to be transferred.

Unique addresses are given to a data storage area of each device that can be a source or destination of a data transfer (namely, the general storage device 106, the encryption device 107, and the secret information storage device 108, these devices are hereafter collectively called a "slave device"). The DMA controller 104 identifies a slave device based on addresses assigned to its data storage area.

The slave device is roughly composed of a memory, a hard disk, and an arithmetic unit.

The DMA controller 104 includes a DMA setting register 1041, a rank setting register 1042, and a lower rank limit register 1043. The DMA controller 104 exercises the following data transfer control operation in response to a data transfer request from any of the master devices 103 and 105.

(1) Preprocessing

The DMA controller 104 stores a data transfer condition contained in the data transfer request in the DMA setting register 1041, thereby setting the data transfer condition in the DMA setting register 1041. The DMA controller 104 receives, from the master device which has made the data transfer request, a rank of the master device, and stores the received rank in the rank setting register 1042. The DMA controller 104 also obtains control of the data/address bus 101 from the master device.

(2) Data Transfer

The DMA controller 104 repeatedly performs the following process, until a transfer of data of a size specified by the data transfer condition is completed.

The DMA controller 104 sends the rank stored in the rank setting register 1042 to slave devices which are specified as a source and a destination by the data transfer condition, to request access to the slave devices. If the access to the slave devices is granted, that is, if the data transfer is permitted, the DMA controller 104 instructs the source slave device to read data of a predetermined size that can be transferred on the data/address bus 101 at one time. When the read data is output to the data/address bus 101, the DMA controller 104 instructs the destination slave device to write the output data. As a result, the data is written in a data storage area of the destination slave device.

(3) Transfer Interrupt

When a transfer interrupt request is made during the data transfer, the DMA controller 104 stops the data transfer, only if a sender of the transfer interrupt request is a master device whose rank is no lower than the rank stored in the rank setting register 1042. The DMA controller 104 then clears the DMA setting register 1041 for initialization, and sets the rank setting register 1042 to a lower rank limit stored in the lower rank limit register 1043.

The lower rank limit referred to here is a rank which is no higher than a lowest rank assigned to any of the devices in the secret information processing apparatus 100 (the same applies to the embodiments that follow).

The DMA setting register 1041 is used to store a data transfer condition (i.e. a read start address in a data storage area of a source slave device, a write start address in a data storage area of a destination slave device, and a size of data to be transferred) contained in a data transfer request received from any of the master devices 103 and 105 in a data transfer operation A (described later).

The rank setting register 1042 is used to store a rank of the master device received from the master device in the data transfer operation A.

The lower rank limit register 1043 stores the predetermined lower rank limit.

The general storage device 106 has a data storage area and a rank register 1061, and stores data of a low level of secrecy in the data storage area.

The encryption device 107 has a data storage area and a rank register 1071. The encryption device 107 encrypts or decrypts data using an encryption key, and stores the encrypted or decrypted data in the data storage area.

The secret information storage device 108 has a data storage area and a rank register 1081, and stores data of a high level of secrecy such as the encryption key in the data storage area.

<Operation>

The data transfer operation A performed by the secret information processing apparatus 100 is described below.

Figure 2:
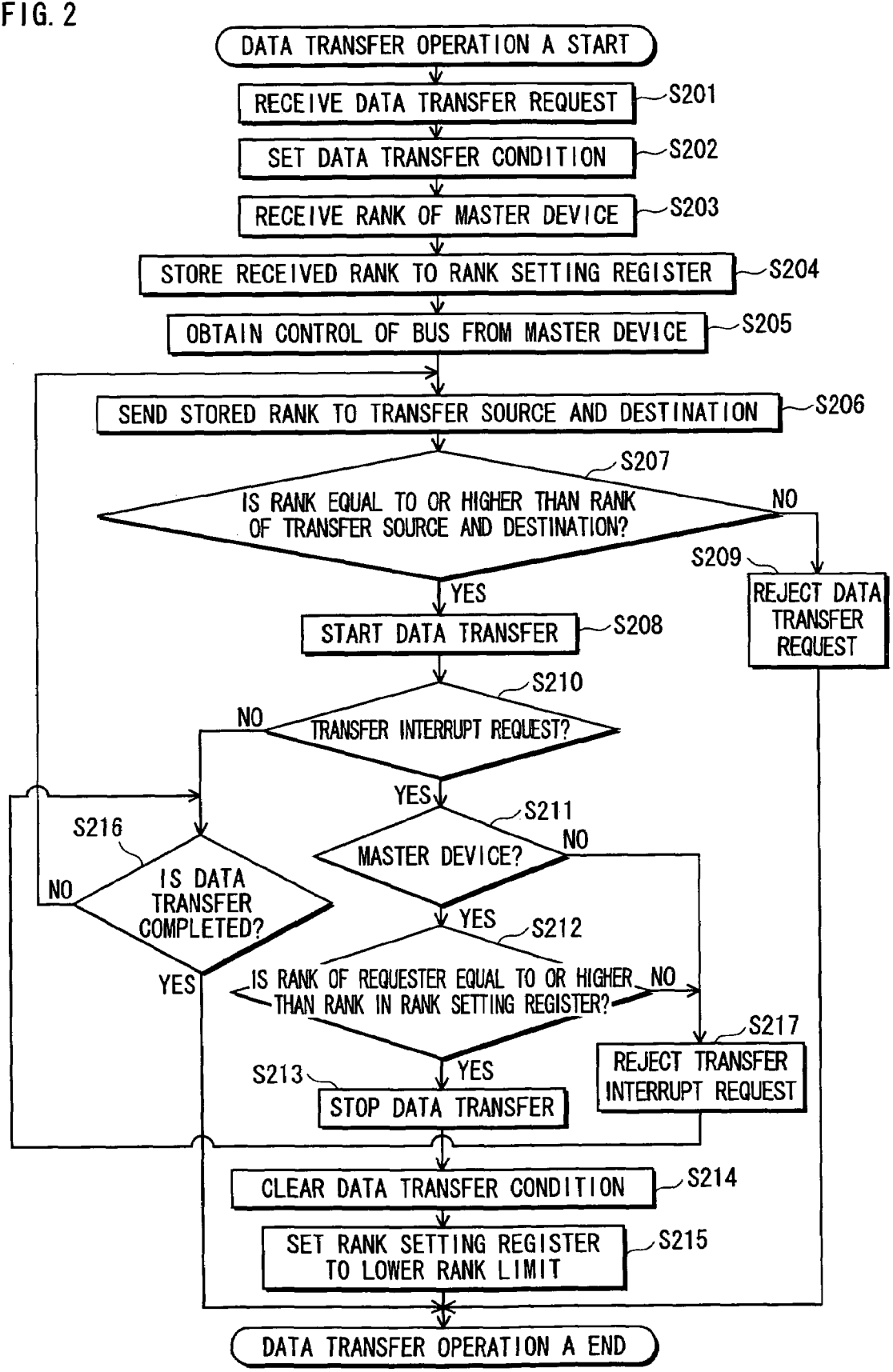
FIG. 2 is a flowchart showing a data transfer operation A performed by the secret information processing apparatus in the first embodiment.

FIG. 2 is a flowchart showing the data transfer operation A.

Upon receiving a data transfer request from any of the master devices 103 and 105 (step S201), the DMA controller 104 stores a data transfer condition contained in the data transfer request in the DMA setting register 1041, thereby setting the data transfer condition in the DMA setting register 1041 (step S202). The DMA controller 104 requests the master device which has made the data transfer request, to send a rank of the master device. Upon receiving the rank of the master device (step S203), the DMA controller 104 stores the received rank in the rank setting register 1042 (step S204). The DMA controller 104 also requests the master device to free the data/address bus 101, to obtain control of the data/address bus 101 from the master device (step S205). The DMA controller 104 sends the rank stored in the rank setting register 1042 to slave devices which are specified as a source and a destination by the data transfer condition, to request access to the slave devices (step S206).

Having received the rank from the DMA controller 104, each of the source and destination slave devices judges whether the received rank is no lower than a rank of the slave device (step S207). If the received rank is no lower than the rank of the slave device (step S207: YES), the slave device grants access by sending a transfer permission signal to the DMA controller 104. If the received rank is lower than the rank of the slave device (step S207: NO), the slave device denies access by sending a transfer prohibition signal to the DMA controller 104 (step S209).

Upon receiving the transfer permission signal from each of the source and destination slave devices, the DMA controller 104 notifies the source slave device of the read start address stored in the DMA setting register 1041, and instructs the source slave device to read data of the predetermined size from the read start address and output the read data to the data/address bus 101. The DMA controller 104 also notifies the destination slave device of the write start address stored in the DMA setting register 1041, and instructs the destination slave device to write the output data to the write start address. In this way, the DMA controller 104 starts the data transfer (step S208).

If there is no transfer interrupt request in step S210 (described later), the DMA controller 104 repeats step S208 until a transfer of data of the size stored in the DMA setting register 1041 is completed. When doing so, each time a transfer of data of the predetermined size is completed, the DMA controller 104 increments each of the read start address and the write start address in the DMA setting register 1041 by a value corresponding to the predetermined size, and decrements the data size in the DMA setting register 1041 by the predetermined size.

By doing so, the read start address to be notified to the source slave device and the write start address to be notified to the destination slave device are updated each time a transfer of data of the predetermined size is completed.

The DMA controller 104 monitors whether a transfer interrupt request has been made (step S210). If there is no transfer interrupt request (step S210: NO), the DMA controller 104 judges whether the requested data transfer is completed, based on the data size stored in the DMA setting register 1041 at this point (step S216). If the data transfer is not completed (step S216: NO), the DMA controller 104 returns to step S206. If the data transfer is completed (step S216: YES), the DMA controller 104 ends the operation.

If there is a transfer interrupt request (step S210: YES), the DMA controller 104 judges whether a sender of the transfer interrupt request is a master device (step S211). If the sender is a master device (step S211: YES), the DMA controller 104 receives a rank of the master device from the master device, and judges whether the received rank is no lower than the rank stored in the rank setting register 1042 (step S212). If the received rank is no lower than the rank in the rank setting register 1042 (step S212: YES), the DMA controller 104 stops the data transfer (S213), and erases the data transfer condition in the DMA setting register 1041 (step S214). The DMA controller 104 also replaces the rank in the rank setting register 1042 with the lower rank limit stored in the lower rank limit register 1043, thereby setting the rank setting register 1042 to the lower rank limit (step S215).

Second Embodiment

<Construction>

Figure 3:
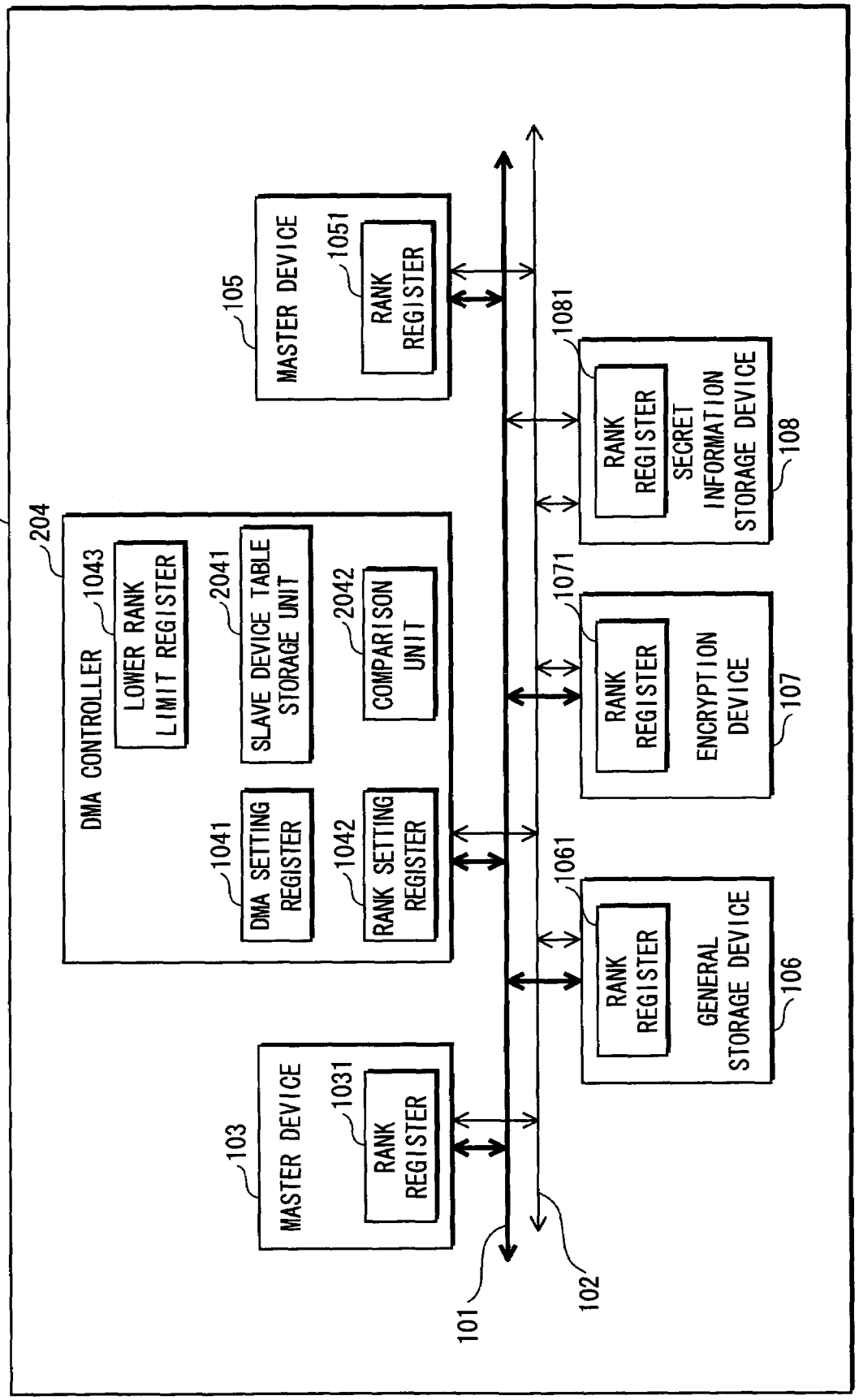
FIG. 3 is a functional block diagram showing a construction of a secret information processing apparatus to which a second embodiment of the present invention relates.

FIG. 3 is a functional block diagram showing a construction of a secret information processing apparatus 200 to which a second embodiment of the present invention relates.

As shown in the drawing, the secret information processing apparatus 200 is roughly made up of devices that include the data/address bus 101, the rank bus 102, the master device 103, a DMA controller 204, the master device 105, the general storage device 106, the encryption device 107, and the secret information storage device 108.

In FIG. 3, construction elements which are the same as those in the secret information processing apparatus 100 in the first embodiment have been given the same reference numerals and their explanation has been omitted. The following describes the differences from the first embodiment.

Note here that the secret information processing apparatus 200 may be connected to an external device via an external interface.

The DMA controller 204 includes the DMA setting register 1041, the rank setting register 1042, the lower rank limit register 1043, a slave device table storage unit 2041, and a comparison unit 2042.

The slave device table storage unit 2041 stores a slave device table.

The slave device table referred to here is a table that shows ranks corresponding to each possible combination of a source slave device and a destination slave device. In detail, the slave device table shows, for each possible combination of a source slave device and a destination slave device, a correspondence between address ranges of data storage areas of the source and destination slave devices and ranks of the source and destination slave devices.

FIG. 4 shows a specific example of the slave device table. Though the slave device table shown in FIG. 4 has a slave device name field, the slave device name field may be omitted.

The comparison unit 2042 compares, in a data transfer control operation B (described later), a rank of a master device which has made a data transfer request with each rank corresponding to a combination of source and destination slave devices whose address ranges respectively include a read start address and a write start address specified in the data transfer request, with reference to the slave device table.

The DMA controller 204 exercises the following data transfer control operation B in response to a data transfer request from any of the master devices 103 and 105.

(1) Preprocessing

The DMA controller 204 stores a data transfer condition contained in the data transfer request in the DMA setting register 1041, thereby setting the data transfer condition in the DMA setting register 1041. The DMA controller 204 searches the slave device table for a combination of source and destination slave devices whose address ranges respectively include a read start address and a write start address specified by the data transfer condition. If there is no such combination, the DMA controller 204 terminates the data transfer control. If there is such a combination, the DMA controller 204 calculates, based on the read start address, the write start address, and a data size specified by the data transfer condition, an address range necessary for reading all data of the data size (hereafter "read address range") and an address range necessary for writing all of the read data (hereafter "write address range"). The DMA controller 204 judges whether the read address range is within the address range of the source slave device and whether the write address range is within the address range of the destination slave device, with reference to the slave device table. If any of the read address range and the write address range is not within the corresponding address range in the slave device table, the DMA controller 204 terminates the data transfer control. If both the read address range and the write address range are within the corresponding address ranges in the slave device table, the DMA controller 204 specifies ranks corresponding to the combination in the slave device table. The DMA controller 204 receives a rank of the master device from the master device, and compares the received rank with each of the specified ranks. If the received rank is no lower than any of the specified ranks, the DMA controller 204 stores the received rank in the rank setting register 1042, and obtains control of the data/address bus 101 from the master device.

(2) Data Transfer

The DMA controller 204 performs the same data transfer process as the DMA controller 104 in the first embodiment.

(3) Transfer Interrupt

The DMA controller 204 performs the same transfer interrupt process as the DMA controller 104 in the first embodiment.

<Operation>

The data transfer control operation B performed by the DMA controller 204 is described below.

Figure 6:
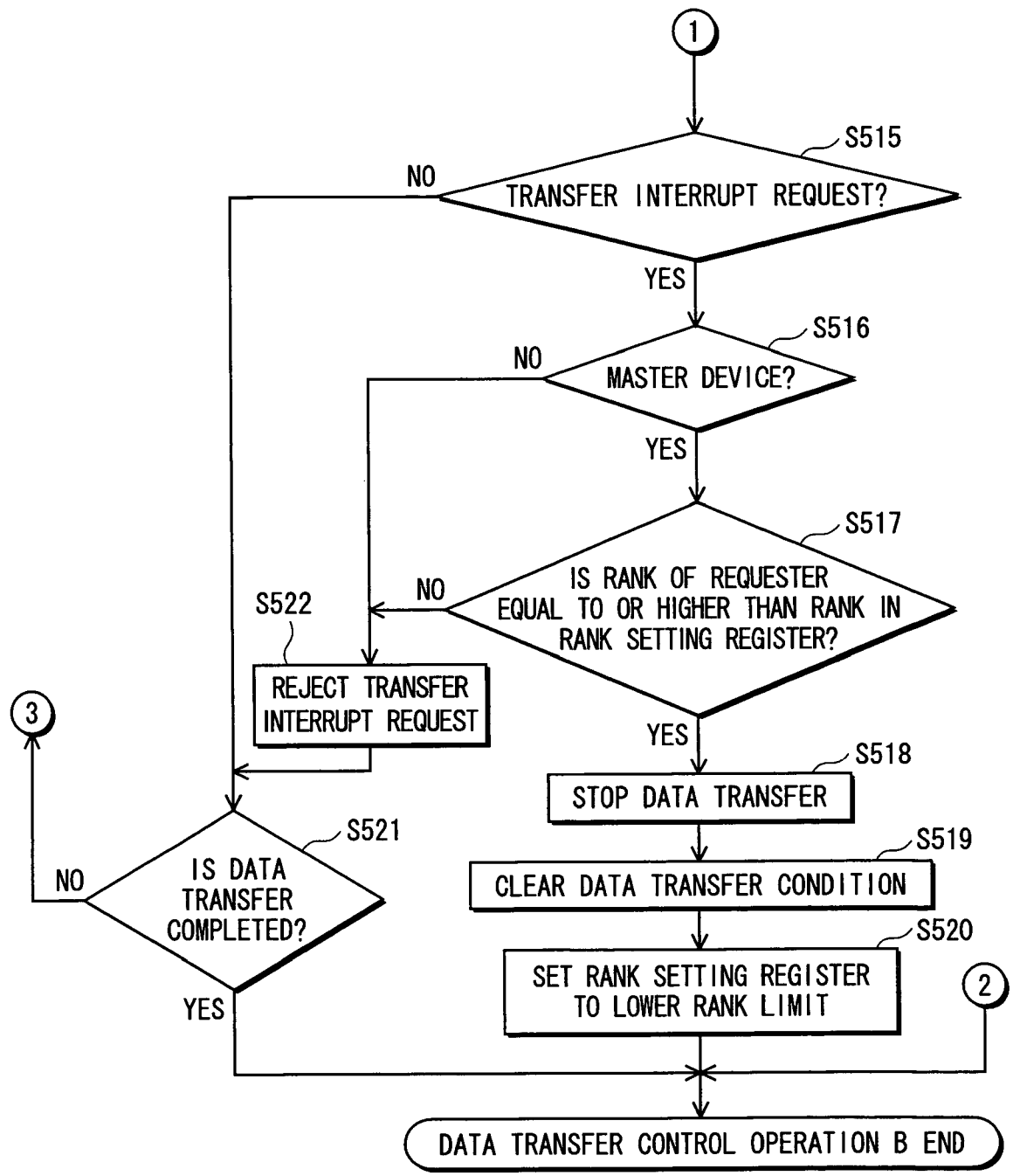
FIG. 6 is a flowchart showing the other part of the data transfer control operation B.

FIGS. 5 and 6 are flowcharts showing the data transfer control operation B.

Upon receiving a data transfer request from any of the master devices 103 and 105 (step S501), the DMA controller 204 stores a data transfer condition contained in the data transfer request in the DMA setting register 1041, thereby setting the data transfer condition in the DMA setting register 1041 (step S502). The DMA controller 204 then searches the slave device table for a combination of source and destination slave devices whose address ranges respectively include a read start address and a write start address specified by the data transfer condition (step S503).

If there is no such combination (step S503: NO), the DMA controller 204 erases the data transfer condition in the DMA setting register 1041 (step S512), and terminates the operation. If the combination is found in the slave device table (step S503: YES), the DMA controller 204 calculates a read address range and a write address range based on the read start address, the write start address, and a data size specified by the data transfer condition. The DMA controller 204 then judges whether the read address range is within the address range of the source slave device and whether the write address range is within the address range of the destination slave device, with reference to the slave device table (step S504).

If any of the read address range and the write address range is not within the corresponding address range in the slave device table (step S504: NO), the DMA controller 204 advances to step S512. If both the read address range and the write address range are within the corresponding address ranges in the slave device table (step S504: YES), the DMA controller 204 specifies ranks corresponding to the combination of the source and destination slave devices in the slave device table (step S505). The DMA controller 204 receives a rank of the master device from the master device (step S506), and judges whether the received rank is no lower than the rank of the source slave device (step S507).

If the received rank is lower than the rank of the source slave device (step S507: NO), the DMA controller 204 advances to step S512. If the received rank is no lower than the rank of the source slave device (step S507: YES), the DMA controller 204 further judges whether the received rank is no lower than the rank of the destination slave device (step S508). If the received rank is no lower than the rank of the destination slave device (step S508: YES), the DMA controller 204 stores the received rank in the rank setting register 1042 (step S510). The DMA controller 204 then requests the master device to free the data/address bus 101, to obtain control of the data/address bus 101 from the master device (step S511). The DMA controller 204 sends the rank stored in the rank setting register 1042 to the source and destination slave devices, to request access to the slave devices (step S513). The DMA controller 204 then performs the same operation as step S208 shown in FIG. 2, to start the data transfer (step S514).

If the received rank is lower than the rank of the destination slave device (step S508: NO), the DMA controller 204 stores the rank of the destination slave device in the rank setting register 1042 (step S509), and advances to step S511.

Steps S515 to S522 are the same as steps S210 to S217 shown in FIG. 2, and so their explanation has been omitted here.

Third Embodiment

<Construction>

Figure 7:
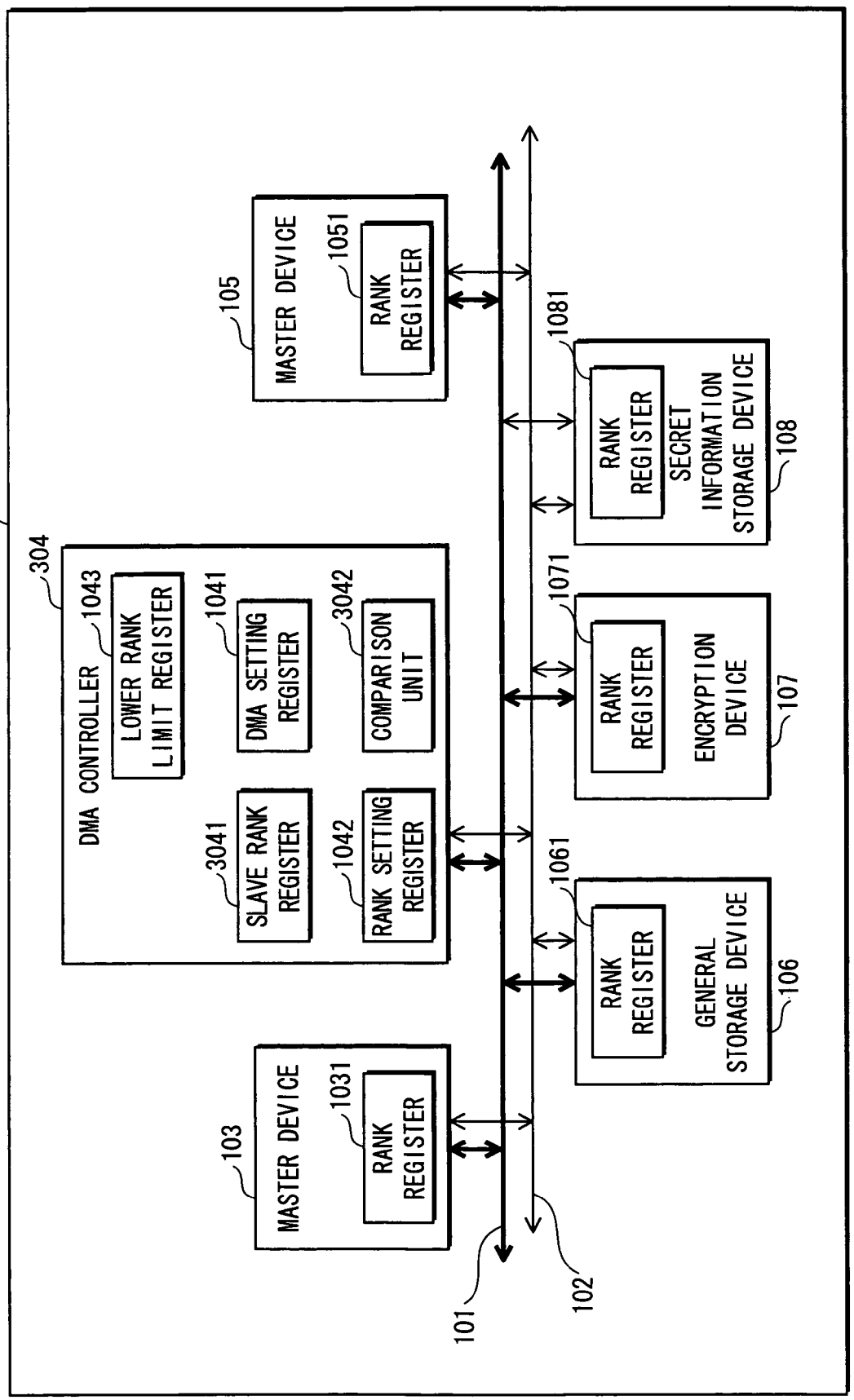
FIG. 7 is a functional block diagram showing a construction of a secret information processing apparatus to which a third embodiment of the present invention relates.

FIG. 7 is a functional block diagram showing a construction of a secret information processing apparatus 300 to which a third embodiment of the present invention relates.

As shown in the drawing, the secret information processing apparatus 300 is roughly made up of devices that include the data/address bus 101, the rank bus 102, the master device 103, a DMA controller 304, the master device 105, the general storage device 106, the encryption device 107, and the secret information storage device 108.

In FIG. 7, construction elements which are the same as those in the secret information processing apparatus 100 in the first embodiment have been given the same reference numerals and their explanation has been omitted. The following describes the differences from the first embodiment.

Note here that the secret information processing apparatus 300 may be connected to an external device via an external interface.

The DMA controller 304 includes the DMA setting register 1041, the rank setting register 1042, the lower rank limit register 1043, a slave rank register 3041, and a comparison unit 3042.

The slave rank register 3041 is used to store a rank received from a source slave device or a destination slave device in a data transfer control operation C (described later).

The comparison unit 3042 compares a rank received from the source slave device with a rank received from the destination slave device, and also compares a rank received from a master device which has made a data transfer request with the rank stored in the slave rank register 3041, in the data transfer control operation C.

The DMA controller 304 exercises the following data transfer control operation C in response to a data transfer request from any of the master devices 103 and 105.

(1) Preprocessing

The DMA controller 304 stores a data transfer condition contained in the data transfer request in the DMA setting register 1041, thereby setting the data transfer condition in the DMA setting register 1041. The DMA controller 304 receives ranks of source and destination slave devices specified by the data transfer condition, from the source and destination slave devices. The DMA controller 304 compares the received ranks with each other, and stores a higher rank in the slave rank register 3041. The DMA controller 304 also receives a rank of the master device from the master device, and compares the rank of the master device with the rank stored in the slave rank register 3041. If the rank of the master device is no lower than the rank in the slave rank register 3041, the DMA controller 304 stores the rank of the master device in the rank setting register 1042, and obtains control of the data/address bus 101 from the master device.

(2) Data Transfer

The DMA controller 304 performs the same data transfer process as the DMA controller 104 in the first embodiment.

(3) Transfer Interrupt

The DMA controller 304 performs the same transfer interrupt process as the DMA controller 104 in the first embodiment.

<Operation>

The data transfer control operation C performed by the DMA controller 304 is described below.

Figure 8:
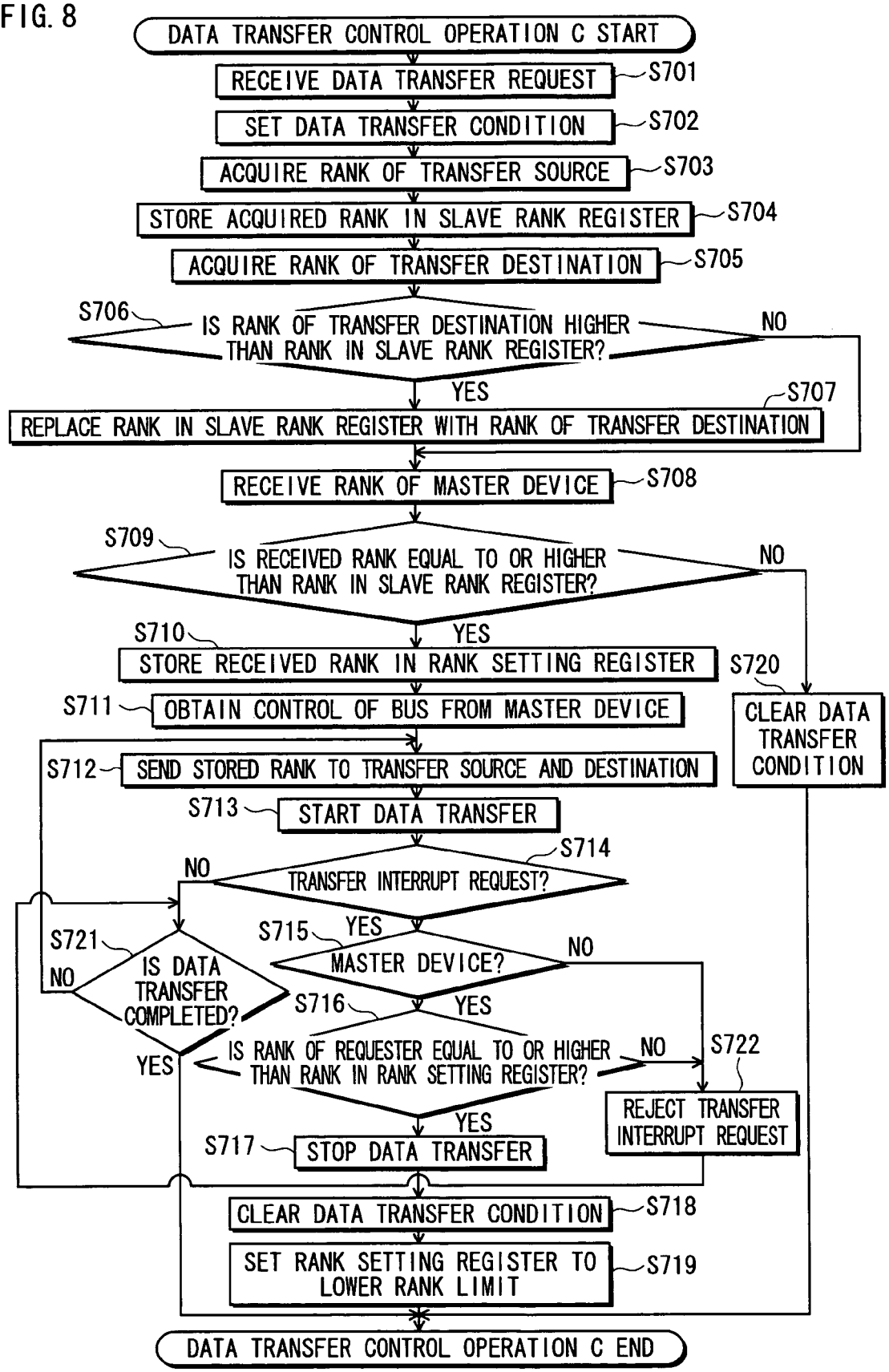
FIG. 8 is a flowchart showing a data transfer control operation C performed by a DMA controller shown in FIG. 7, in the third embodiment.

FIG. 8 is a flowchart showing the data transfer control operation C.

Upon receiving a data transfer request from any of the master devices 103 and 105 (step S701), the DMA controller 304 stores a data transfer condition contained in the data transfer request in the DMA setting register 1041, thereby setting the data transfer condition in the DMA setting register 1041 (step S702). The DMA controller 304 acquires a rank from a source slave device specified by the data transfer condition (step S703), and stores the acquired rank in the slave rank register 3041 (step S704).

The DMA controller 304 also acquires a rank from a destination slave device specified by the data transfer condition (step S705), and judges whether the rank of the destination slave device is higher than the rank of the source slave device stored in the slave rank register 3041 (step S706). If the rank of the destination slave device is not higher than the rank of the source slave device (step S706: NO), the DMA controller 304 advances to step S708. If the rank of the destination slave device is higher than the rank of the source slave device (step S706: YES), the DMA controller 304 replaces the rank in the slave rank register 3041 with the rank of the destination slave device (step S707). The DMA controller 304 then receives a rank of the master device from the master device (step S708), and judges whether the received rank is no lower than the rank stored in the slave rank register 3041 (step S709).

If the received rank is lower than the rank in the slave rank register 3041 (step S709: NO), the DMA controller 304 erases the data transfer condition in the DMA setting register 1041 (step S720), and terminates the operation. If the received rank is no lower than the rank in the slave rank register 3041 (step S709: YES), the DMA controller 304 performs steps S710 to S719, S721, and S722 which are the same as steps S510, S511, and S513 to S522 shown in FIGS. 5 and 6.

Fourth Embodiment

<Construction>

Figure 9:
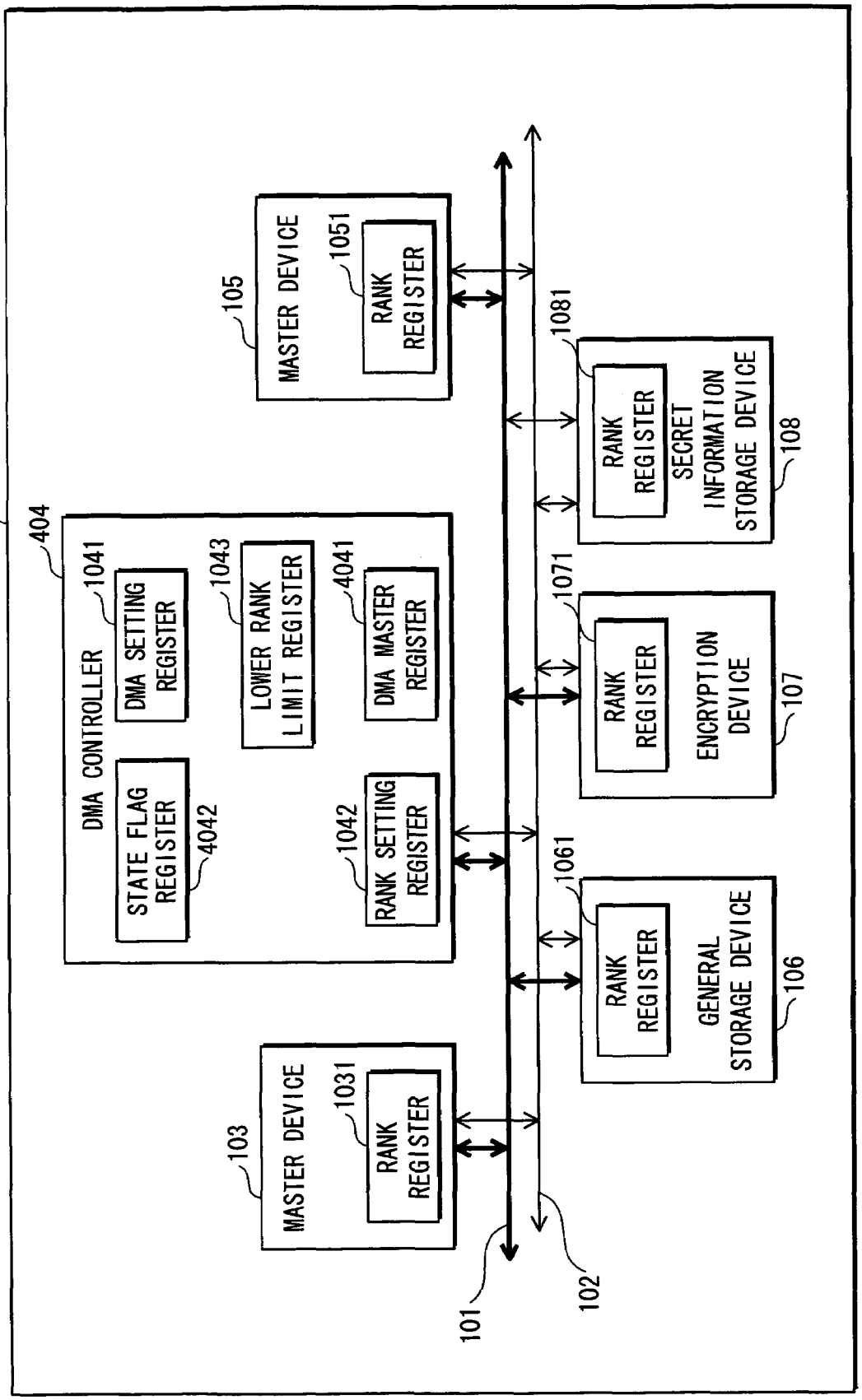
FIG. 9 is a functional block diagram showing a construction of a secret information processing apparatus to which a fourth embodiment of the present invention relates.

FIG. 9 is a functional block diagram showing a construction of a secret information processing apparatus 400 to which a fourth embodiment of the present invention relates.

As shown in the drawing, the secret information processing apparatus 400 is roughly made up of devices that include the data/address bus 101, the rank bus 102, the master device 103, a DMA controller 404, the master device 105, the general storage device 106, the encryption device 107, and the secret information storage device 108.

In FIG. 9, construction elements which are the same as those in the secret information processing apparatus 100 in the first embodiment have been given the same reference numerals and their explanation has been omitted. The following describes the differences from the first embodiment.

Note here that the secret information processing apparatus 400 may be connected to an external device via an external interface.

The DMA controller 404 includes the DMA setting register 1041, the rank setting register 1042, the lower rank limit register 1043, a DMA master register 4041, and a state flag register 4042.

The DMA master register 4041 is used to store an identifier of a master device which has made a data transfer request.

The state flag register 4042 stores a state flag which indicates whether a data transfer request is to be accepted or rejected.

In detail, the state flag shows whether the DMA controller 404 is in a state in which a data transfer can be permitted in response to a data transfer request. The state flag shows "not permitted" while a data transfer is being performed, and "permitted" after the data transfer is completed.

The DMA controller 404 exercises the following data transfer control operation D in response to a data transfer request from any of the master devices 103 and 105.

(1) Preprocessing

Upon receiving the data transfer request from the master device, the DMA controller 404 continues the data transfer control only if the state flag in the state flag register 4042 shows "permitted" or if an identifier of the master device which has made the data transfer request is stored in the DMA master register 4041. The DMA controller 404 changes the state flag to "not permitted", and stores the identifier of the master device in the DMA master register 4041. The DMA controller 404 also stores a data transfer condition contained in the data transfer request in the DMA setting register 1041, thereby setting the data transfer condition in the DMA setting register 1041. The DMA controller 404 receives a rank of the master device from the master device, and stores the received rank in the rank setting register 1042. The DMA controller 404 then obtains control of the data/address bus 101 from the master device.

(2) Data Transfer

The DMA controller 404 performs the same data transfer process as the DMA controller 104 in the first embodiment.

(3) Transfer Interrupt

The DMA controller 404 performs the same transfer interrupt process as the DMA controller 104 in the first embodiment.

(4) Postprocessing

After the data transfer process or the transfer interrupt process, the DMA controller 404 erases the identifier of the master device in the DMA master register 4041, and sets the state flag in the state flag register 4042 to "permitted".

<Operation>

A data transfer operation D performed by the secret information processing apparatus 400 is described below.

Figure 10:
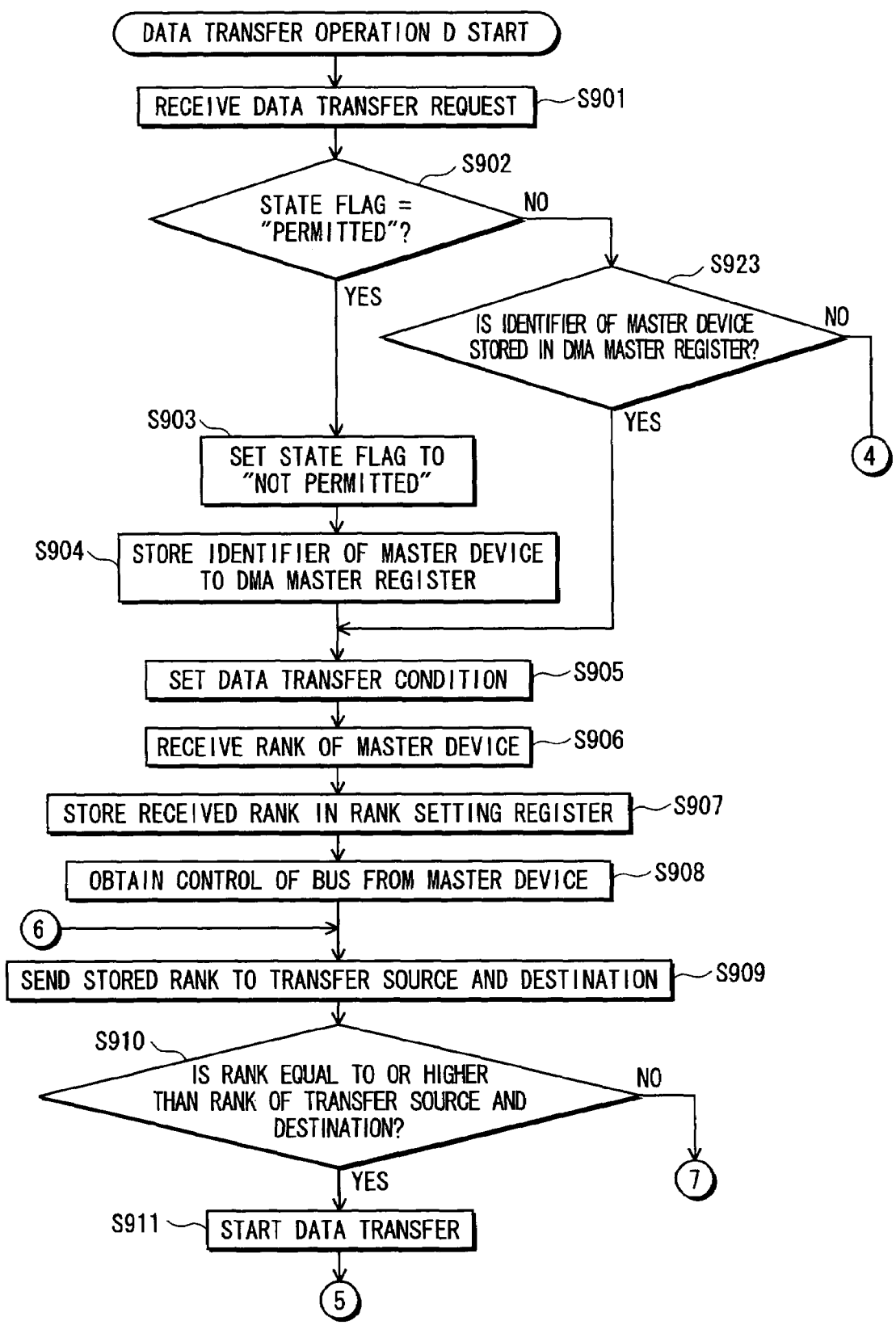
FIG. 10 is a flowchart showing one part of a data transfer operation D performed by the secret information processing apparatus in the fourth embodiment.
Figure 11:
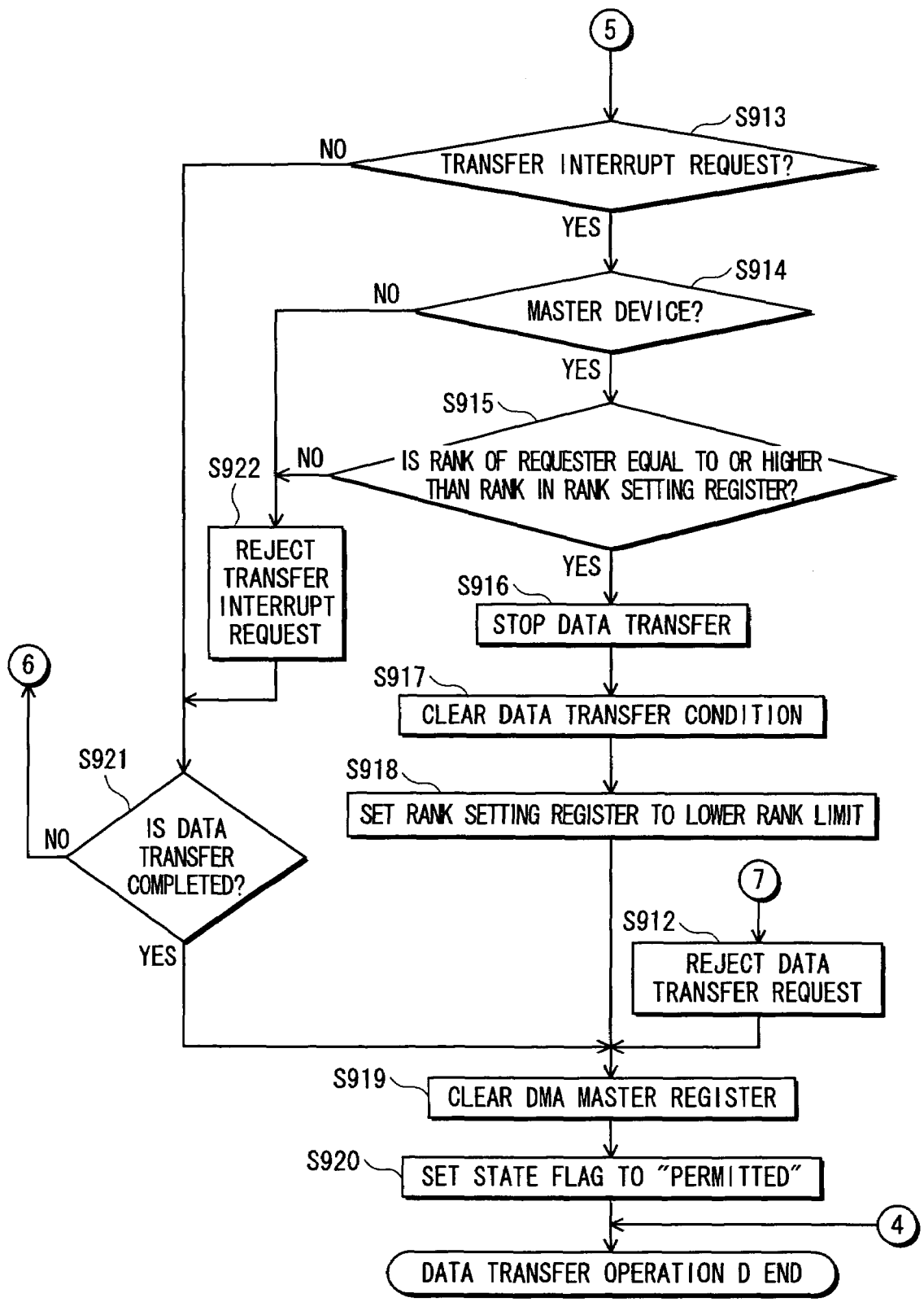
FIG. 11 is a flowchart showing the other part of the data transfer operation D.

FIGS. 10 and 11 are flowcharts showing the data transfer operation D.

Upon receiving a data transfer request from any of the master devices 103 and 105 (step S901), the DMA controller 404 judges whether the state flag in the state flag register 4042 shows "permitted" (step S902). If the state flag shows "permitted" (step S902: YES), the DMA controller 404 sets the state flag to "not permitted" (step S903), and stores an identifier of the master device in the DMA master register 4041 (step S904). The DMA controller 404 also stores a data transfer condition contained in the data transfer request in the DMA setting register 1041, thereby setting the data transfer condition in the DMA setting register 1041 (step S905).

If the state flag shows "not permitted" (step S902: NO), the DMA controller 404 judges whether the identifier of the master device is stored in the DMA master register 4041 (step S923). If the identifier of the master device is stored in the DMA master register 4041 (step S923: YES), the DMA controller 404 advances to step S905. If the identifier of the master device is not stored in the DMA master register 4041 (step S923: NO), the DMA controller 404 terminates the operation.

Steps S906 to S918, S921, and S922 which follow step S905 are the same as steps S203 to S217 shown in FIG. 2, and so their explanation has been omitted here.

After any of steps S912, S918, and S921, the DMA controller 404 erases the identifier of the master device in the DMA master register 4041 (step S919), and sets the state flag to "permitted" (step S920).

Fifth Embodiment

<Construction>

Figure 12:
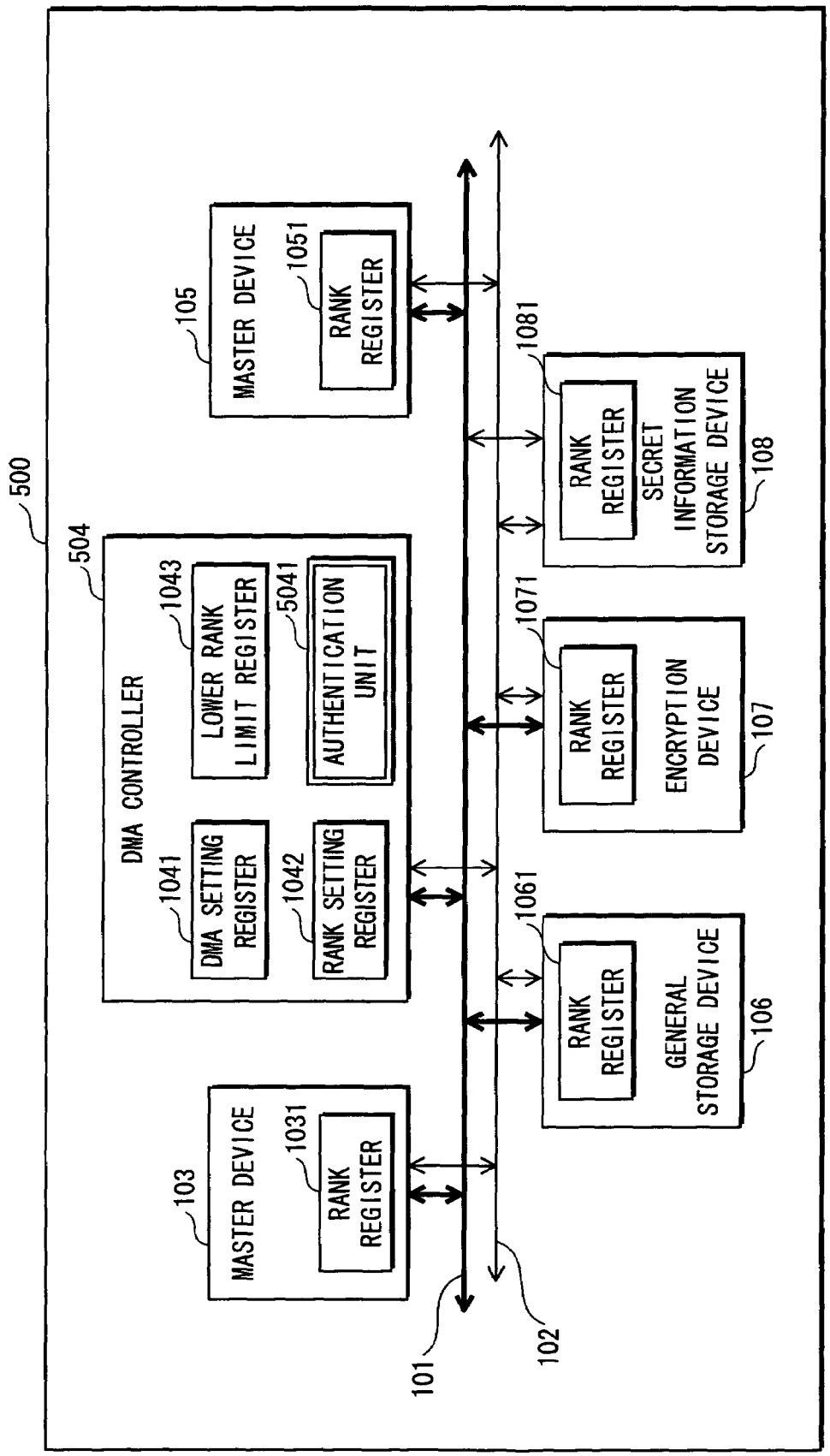
FIG. 12 is a functional block diagram showing a construction of a secret information processing apparatus to which a fifth embodiment of the present invention relates.

FIG. 12 is a functional block diagram showing a construction of a secret information processing apparatus 500 to which a fifth embodiment of the present invention relates.

As shown in the drawing, the secret information processing apparatus 500 is roughly made up of devices that include the data/address bus 101, the rank bus 102, the master device 103, a DMA controller 504, the master device 105, the general storage device 106, the encryption device 107, and the secret information storage device 108.

In FIG. 12, construction elements which are the same as those in the secret information processing apparatus 100 in the first embodiment have been given the same reference numerals and their explanation has been omitted. The following describes the differences from the first embodiment.

Note here that the secret information processing apparatus 500 may be connected to an external device via an external interface.

The DMA controller 504 includes the DMA setting register 1041, the rank setting register 1042, the lower rank limit register 1043, and an authentication unit 5041.

The authentication unit 5041 performs authentication in response to an authentication request from any of the master devices 103 and 105. For example, the authentication performed here takes the form of a challenge-response protocol.

The DMA controller 504 exercises the following data transfer control operation E in response to an authentication request from any of the master devices 103 and 105.

(1) Preprocessing

Upon receiving the authentication request from the master device, the DMA controller 504 performs authentication on the master device. If the authentication is successful, the DMA controller 504 performs the same preprocessing as the DMA controller 104 in the first embodiment, in response to a data transfer request from the master device. If the authentication is not successful, the DMA controller 504 sets the rank setting register 1042 to the lower rank limit stored in the lower rank limit register 1043, and then obtains control of the data/address bus 101 from the master device in response to the data transfer request from the master device.

(2) Data Transfer

If the authentication is successful, the DMA controller 504 sends a rank of the master device to source and destination slave devices specified by a data transfer condition contained in the data transfer request, to request access to the slave devices. If the authentication is not successful, the DMA controller 504 sends the lower rank limit to the source and destination slave devices, to request access to the slave devices. The DMA controller 504 then performs the same data transfer process as the DMA controller 104 in the first embodiment.

(3) Transfer Interrupt

The DMA controller 504 performs the same transfer interrupt process as the DMA controller 104 in the first embodiment.

<Operation>

A data transfer operation E performed by the secret information processing apparatus 500 is described below.

Figure 13:
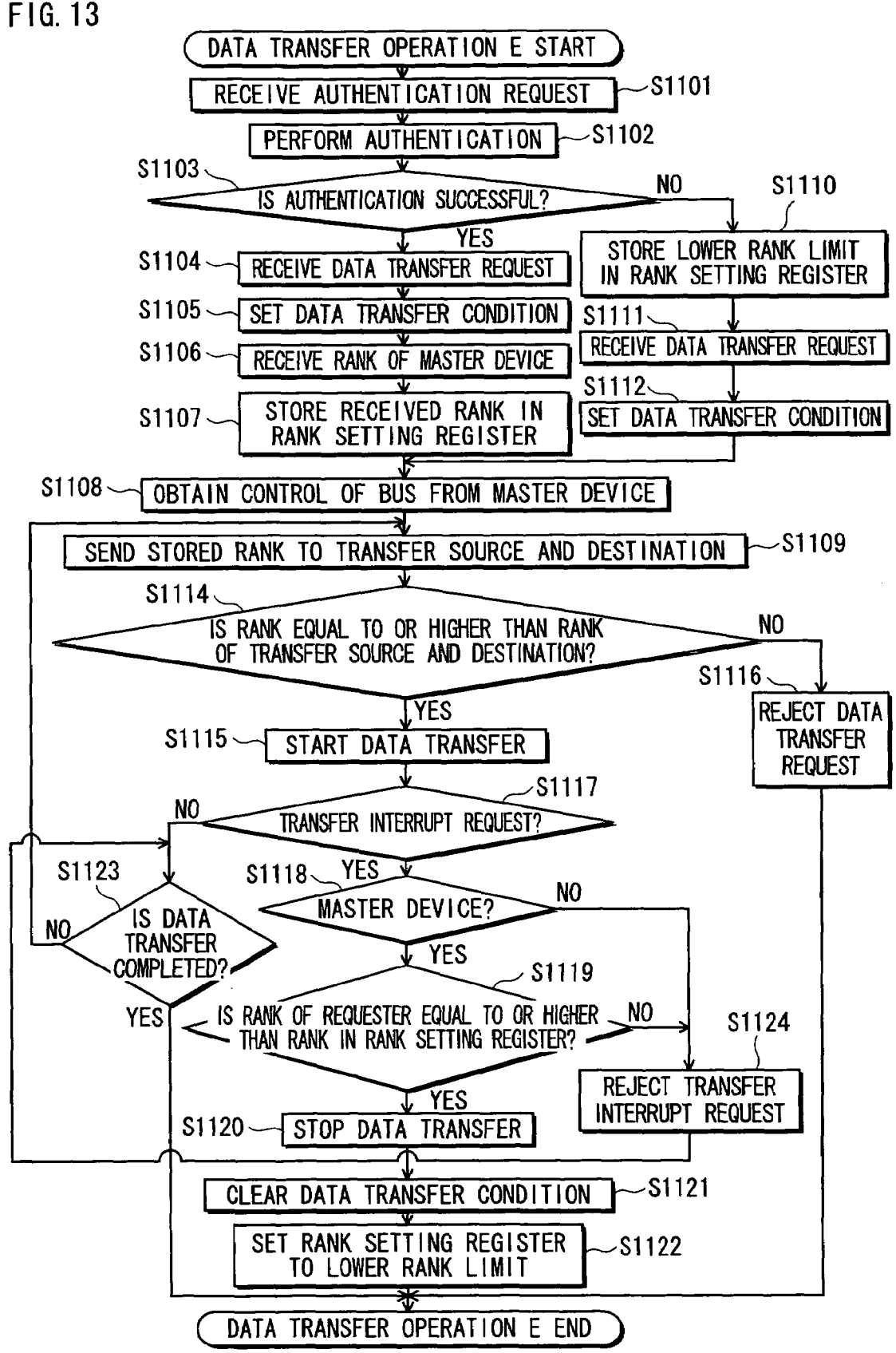
FIG. 13 is a flowchart showing a data transfer operation E performed by the secret information processing apparatus in the fifth embodiment.

FIG. 13 is a flowchart showing the data transfer operation E.

Upon receiving an authentication request from any of the master devices 103 and 105 (step S1101), the DMA controller 504 performs authentication (step S1102). If the authentication is successful (step S1103: YES), the DMA controller 504 receives a data transfer request from the master device (step S1104), and stores a data transfer condition contained in the data transfer request in the DMA setting register 1041, thereby setting the data transfer condition in the DMA setting register 1041 (step S1105). The DMA controller 504 also receives a rank of the master device from the master device (step S1106), and stores the received rank in the rank setting register 1042 (step S1107). The DMA controller 504 then requests the master device to free the data/address bus 101, and obtains control of the data/address bus 101 from the master device (step S1108). The DMA controller 504 sends the rank stored in the rank setting register 1042 to source and destination slave devices specified by the data transfer condition, to request access to the slave devices (step S1109).

If the authentication is not successful (step S1103: NO), the DMA controller 504 stores the lower rank limit in the rank setting register 1042 (step S1110). The DMA controller 504 then receives the data transfer request from the master device (step S1111), and stores the data transfer condition contained in the data transfer request in the DMA setting register 1041, thereby setting the data transfer condition in the DMA setting register 1041 (step S1112). After this, the DMA controller 504 advances to step S1108.

Steps S1114 to S1124 which follow step S1109 are the same as steps S207 to S217 shown in FIG. 2, and so their explanation has been omitted here.

Sixth Embodiment

<Construction>

Figure 14:
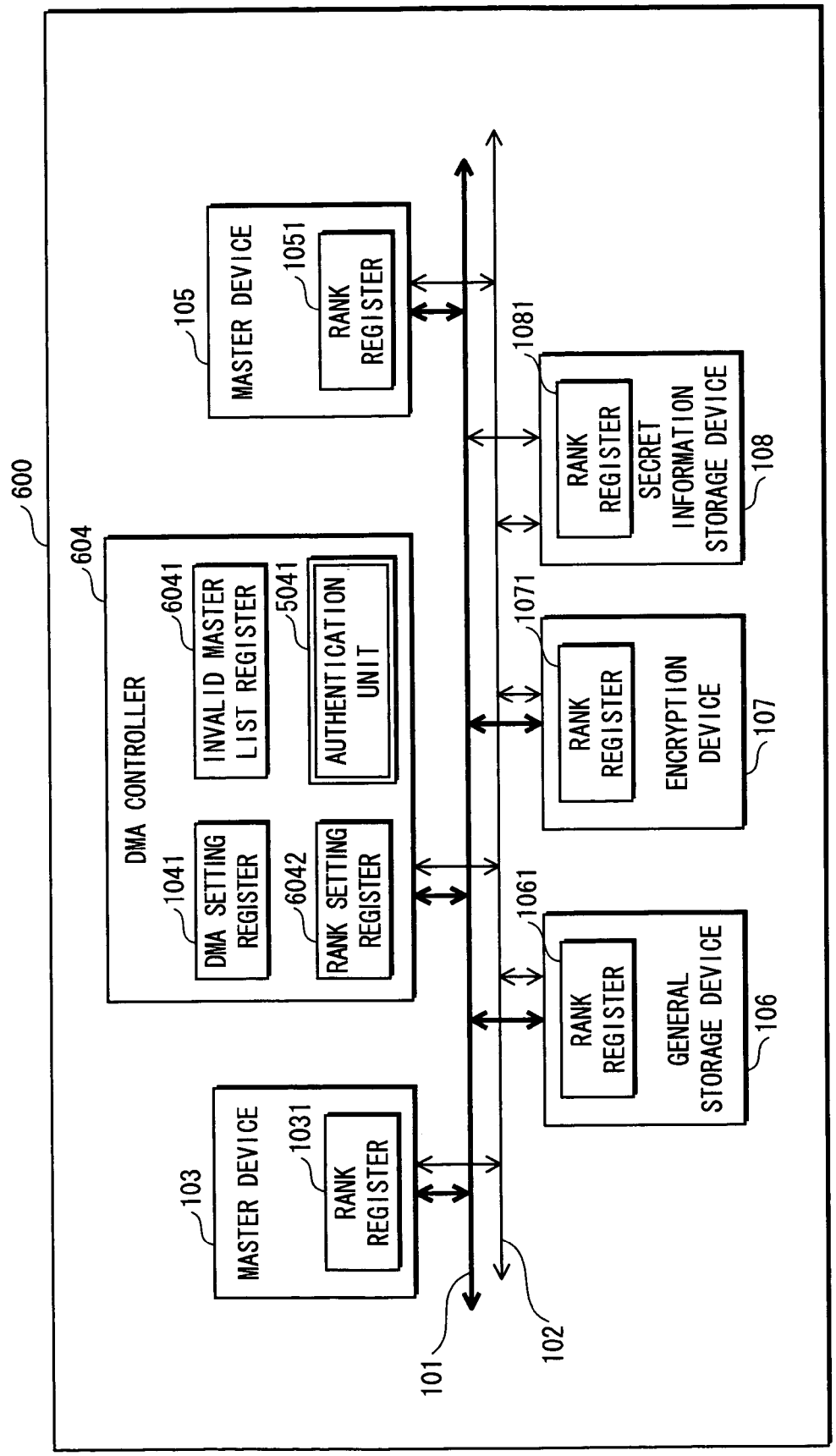
FIG. 14 is a functional block diagram showing a construction of a secret information processing apparatus to which a sixth embodiment of the present invention relates.

FIG. 14 is a functional block diagram showing a construction of a secret information processing apparatus 600 to which a sixth embodiment of the present invention relates.

As shown in the drawing, the secret information processing apparatus 600 is roughly made up of devices that include the data/address bus 101, the rank bus 102, the master device 103, a DMA controller 604, the master device 105, the general storage device 106, the encryption device 107, and the secret information storage device 108.

In FIG. 14, construction elements which are the same as those in the secret information processing apparatuses 100 and 500 in the first and fifth embodiments have been given the same reference numerals and their explanation has been omitted. The following describes the differences from the first and fifth embodiments.

Note here that the secret information processing apparatus 600 may be connected to an external device via an external interface.

The DMA controller 604 includes the DMA setting register 1041, a rank setting register 6042, the authentication unit 5041, and an invalid master list register 6041.

The invalid master list register 6041 is used to store an identifier of a master device whose data transfer request is to be rejected.

The rank setting register 6042 stores a predetermined rank in advance.

The DMA controller 604 exercises the following data transfer control operation F in response to an authentication request from any of the master devices 103 and 105.

(1) Preprocessing

The DMA controller 604 receives the authentication request from the master device. If an identifier of the master device is stored in the invalid master list register 6041, the DMA controller 604 terminates the data transfer control operation F. If the identifier of the master device is not stored in the invalid master list register 6041, the DMA controller 604 performs authentication on the master device. If the authentication is successful, the DMA controller 604 receives a data transfer request from the master device, and stores a data transfer condition contained in the data transfer request in the DMA setting register 1041, thereby setting the data transfer condition in the DMA setting register 1041. The DMA controller 604 also obtains control of the data/address bus 101 from the master device. If the authentication is not successful, on the other hand, the DMA controller 604 stores the identifier of the master device in the invalid master list register 6041, and terminates the data transfer control operation F.

(2) Data Transfer

The DMA controller 604 performs the same data transfer process as the DMA controller 104 in the first embodiment.

(3) Transfer Interrupt

The DMA controller 604 performs the same transfer interrupt process as the DMA controller 104 in the first embodiment, except that the DMA controller 604 does not set the rank setting register 1042 to the lower rank limit.

<Operation>

A data transfer operation F performed by the secret information processing apparatus 600 is described below.

Figure 15:
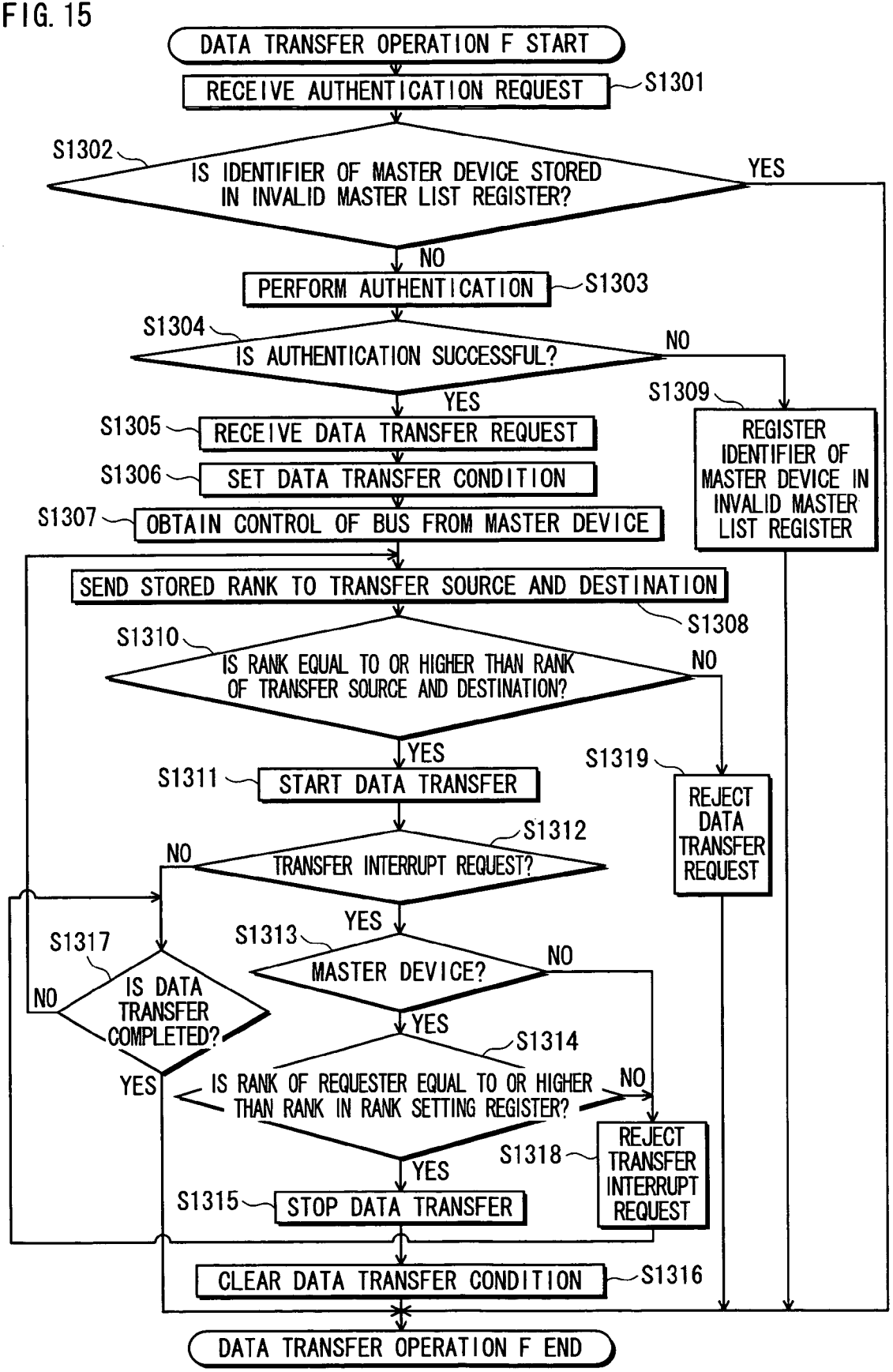
FIG. 15 is a flowchart showing a data transfer operation F performed by the secret information processing apparatus in the sixth embodiment.

FIG. 15 is a flowchart showing the data transfer operation F.

Upon receiving an authentication request from any of the master devices 103 and 105 (step S1301), the DMA controller 604 judges whether an identifier of the master device is stored in the invalid master list register 6041 (step S1302). If the identifier of the master device is stored in the invalid master list register 6041 (step S1302: YES), the DMA controller 604 terminates the operation. If the identifier of the master device is not stored in the invalid master list register 6041 (step S1302: NO), the DMA controller 604 performs authentication (step S1303). If the authentication is successful (step S1304: YES), the DMA controller 604 receives a data transfer request from the master device (step S1305), and stores a data transfer condition contained in the data transfer request in the DMA setting register 1041, thereby setting the data transfer condition in the DMA setting register 1041 (step S1306). The DMA controller 604 also obtains control of the data/address bus 101 from the master device (step S1307), and sends the rank stored in the rank setting register 6042 to source and destination slave devices specified by the data transfer condition, to request access to the slave devices (step S1308).

If the authentication is not successful (step S1304: NO), the DMA controller 604 stores the identifier of the master device in the invalid master list register 6041 (step S1309).

Steps S1310 to S1319 which follow step S1308 are the same as steps S207 to S214, S216, and S217 shown in FIG. 2, and so their explanation has been omitted here.

Seventh Embodiment

<Construction>

Figure 16:
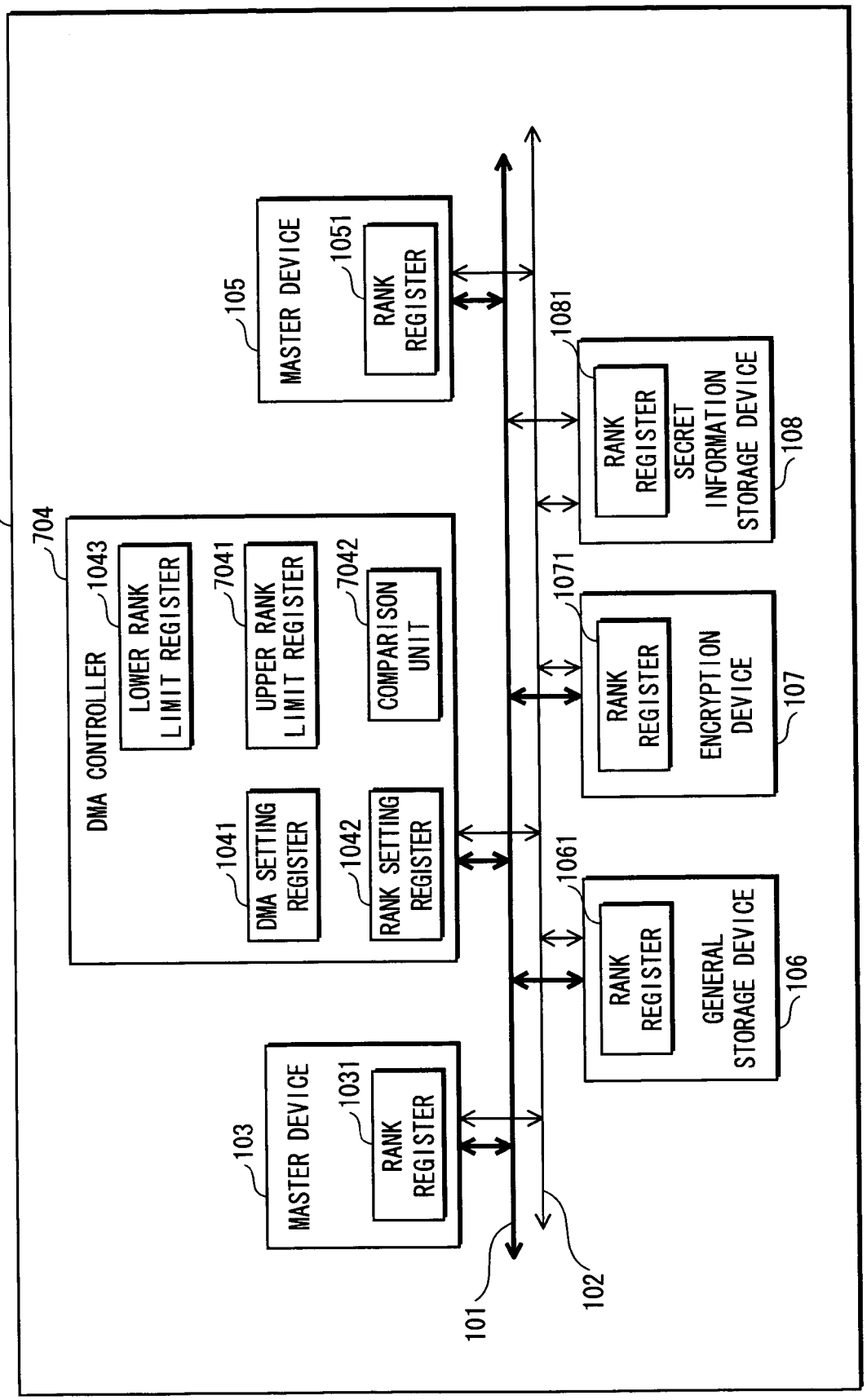
FIG. 16 is a functional block diagram showing a construction of a secret information processing apparatus to which a seventh embodiment of the present invention relates.

FIG. 16 is a functional block diagram showing a construction of a secret information processing apparatus 700 to which a seventh embodiment of the present invention relates.

As shown in the drawing, the secret information processing apparatus 700 is roughly made up of devices that include the data/address bus 101, the rank bus 102, the master device 103, a DMA controller 704, the master device 105, the general storage device 106, the encryption device 107, and the secret information storage device 108.

In FIG. 16, construction elements which are the same as those in the secret information processing apparatus 100 in the first embodiment have been given the same reference numerals and their explanation has been omitted. The following describes the differences from the first embodiment.

Note here that the secret information processing apparatus 700 may be connected to an external device via an external interface.

The DMA controller 704 includes the DMA setting register 1041, the rank setting register 1042, the lower rank limit register 1043, an upper rank limit register 7041, and a comparison unit 7042.

The upper rank limit register 7041 stores a predetermined upper rank limit in advance.

The upper rank limit referred to here is set by a manager of the secret information processing apparatus 700, in order to prevent unauthorized access from a master device whose rank has been set high by falsification. As one example, a highest rank assigned to any of the devices in the secret information processing apparatus 700 is set as the upper rank limit at the time of shipment of the secret information processing apparatus 700.

The comparison unit 7042 performs, in a data transfer control operation G (described later), the following three comparisons: a comparison between a rank of a master device which has made a data transfer request and a rank stored in the rank setting register 1042; a comparison between the rank of the master device and the upper rank limit in the upper rank limit register 7041; and a comparison between a rank of a master device which has made a rank reset request (described later) and the rank stored in the rank setting register 1042.

The DMA controller 704 exercises the following data transfer control operation G.

(1) Preprocessing

The DMA controller 704 receives a rank of a master device from the master device, and compares the received rank with a rank stored in the rank setting register 1042. If the received rank is lower than the rank stored in the rank setting register 1042, the DMA controller 704 terminates the data transfer control operation G. If the received rank is no lower than the rank stored in the rank setting register 1042, the DMA controller 704 further compares the received rank with the upper rank limit stored in the upper rank limit register 7041. If the received rank is higher than the upper rank limit, the DMA controller 704 stores the upper rank limit in the rank setting register 1042. If the received rank is no higher than the upper rank limit, the DMA controller 704 stores the received rank in the rank setting register 1042. The DMA controller 704 then receives a data transfer request from the master device, and stores a data transfer condition contained in the data transfer request in the DMA setting register 1041, thereby setting the data transfer condition in the DMA setting register 1041. The DMA controller 704 also obtains control of the data/address bus 101 from the master device.

It is assumed here that the rank setting register 1042 stores a rank of a master device or the upper rank limit which was stored in the preprocessing of the immediately preceding data transfer control operation. If there is no immediately preceding data transfer control operation, the rank setting register 1042 stores the lower rank limit.

(2) Data Transfer

The DMA controller 704 performs the same data transfer process as the DMA controller 104 in the first embodiment, except that the DMA controller 704 performs a rank reset operation (described later) after a data transfer is completed.

(3) Transfer Interrupt

The DMA controller 704 performs the same transfer interrupt process as the DMA controller 104 in the first embodiment, except that the DMA controller 704 does not set the rank setting register 1042 to the lower rank limit.

<Operation>

A data transfer operation G performed by the secret information processing apparatus 700 is described below.

Figure 17:
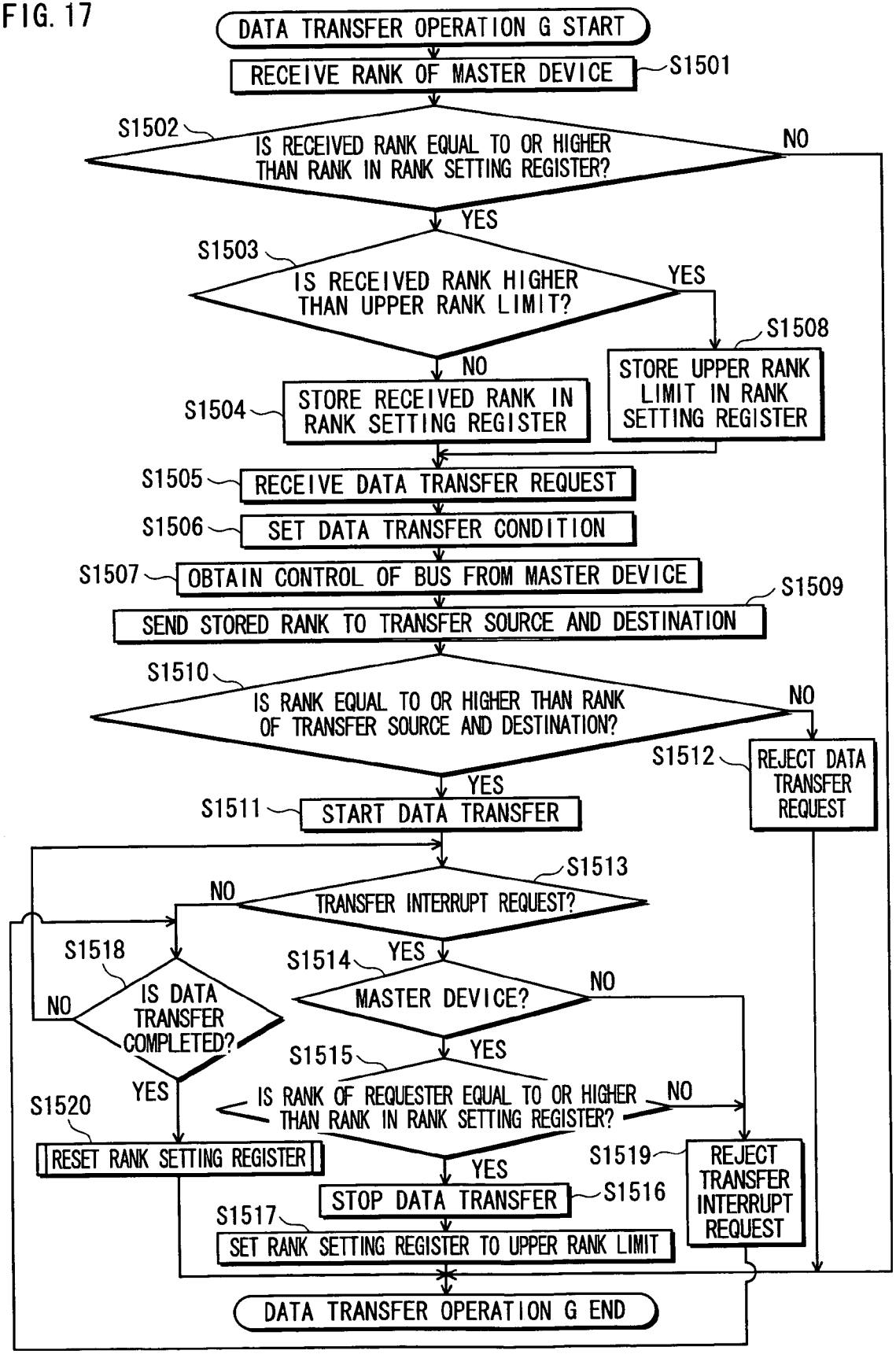
FIG. 17 is a flowchart showing a data transfer operation G performed by the secret information processing apparatus in the seventh embodiment.

FIG. 17 is a flowchart showing the data transfer operation G.

The DMA controller 704 receives a rank of a master device from the master device (step S1501), and judges whether the received rank is no lower than a rank stored in the rank setting register 1042 (step S1502). If the received rank is lower than the rank in the rank setting register 1042 (step S1502: NO), the DMA controller 704 terminates the operation. If the received rank is equal to or higher than the rank in the rank setting register 1042 (step S1502: YES), the DMA controller 704 further judges whether the received rank is higher than the upper rank limit in the upper rank limit register 7041 (step S1503). If the received rank is higher than the upper rank limit (step S1503: YES), the DMA controller 704 stores the upper rank limit in the rank setting register 1042 (step S1508). If the received rank is no higher than the upper rank limit (step S1503: NO), on the other hand, the DMA controller 704 stores the received rank in the rank setting register 1042 (step S1504). The DMA controller 704 receives a data transfer request from the master device (step S1505), and stores a data transfer condition contained in the data transfer request in the DMA setting register 1041, thereby setting the data transfer condition in the DMA setting register 1041 (step S1506). The DMA controller 704 also obtains control of the data/address bus 101 from the master device (step S1507), and sends the rank stored in the rank setting register 1042 to source and destination slave devices specified by the data transfer condition, to request access to the slave devices (step S1509).

Steps S1510 to S1516, S1518, and S1519 which follow step S1509 are the same as steps S207 to S213, S216, and S217 shown in FIG. 2, so that their explanation has been omitted here.

After step S1516, the DMA controller 704 sets the rank setting register 1042 to the upper rank limit stored in the upper rank limit register 7041 (step S1517).

Also, if the data transfer is completed (step S1518: YES), the DMA controller 704 performs a rank reset operation (step S1520).

Figure 18:
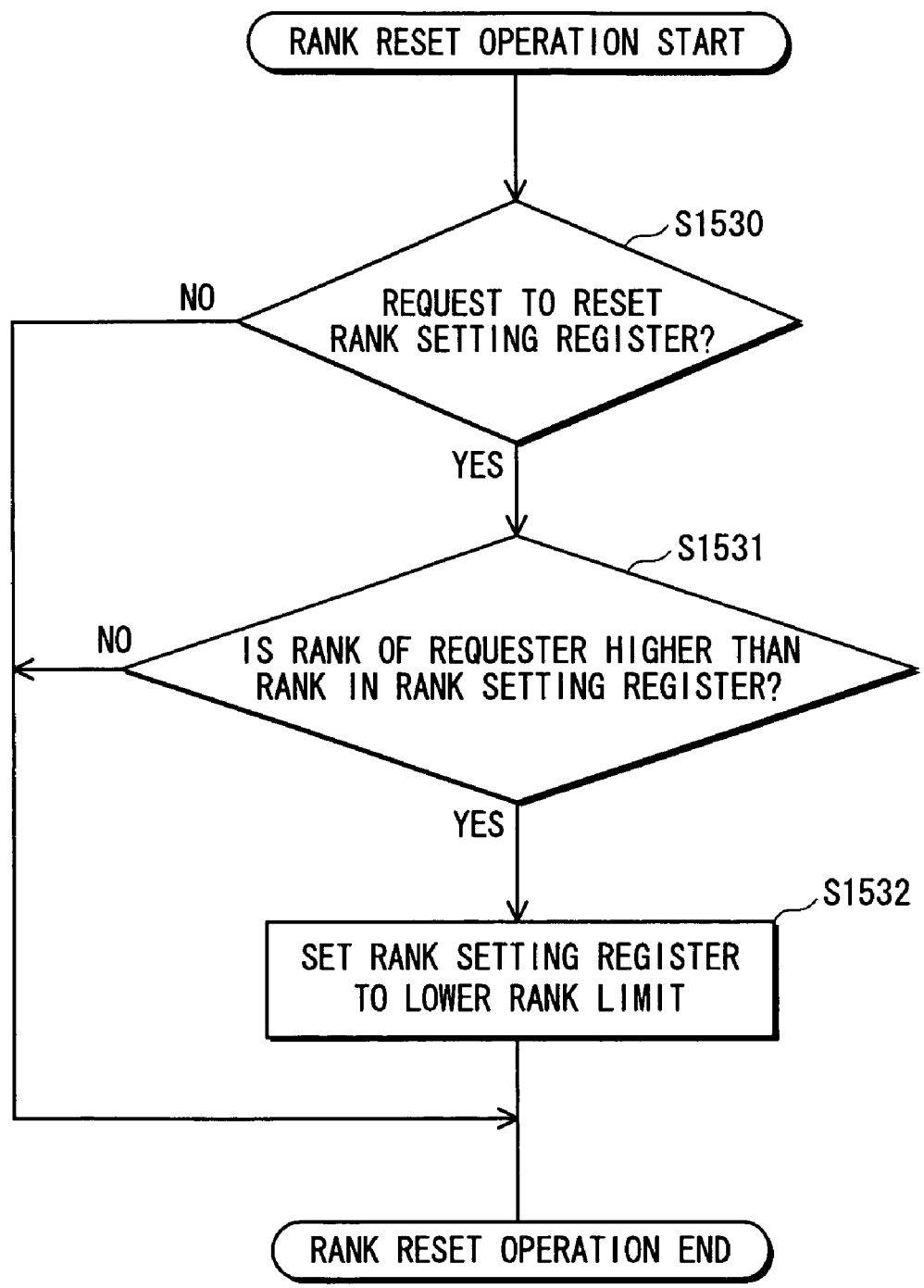
FIG. 18 is a flowchart showing a rank reset operation in the seventh embodiment.

FIG. 18 is a flowchart showing the rank reset operation in step S1520.

Upon receiving a request to reset the rank setting register 1042 from a master device (step S1530: YES), the DMA controller 704 judges whether a rank of the master device is higher than the rank stored in the rank setting register 1042 (step S1531). If the rank of the master device is higher than the rank in the rank setting register 1042 (step S1531: YES), the DMA controller 704 sets the rank setting register 1042 to the lower rank limit stored in the lower rank limit register 1043 (step S1532).

Eighth Embodiment

<Construction>

Figure 19:
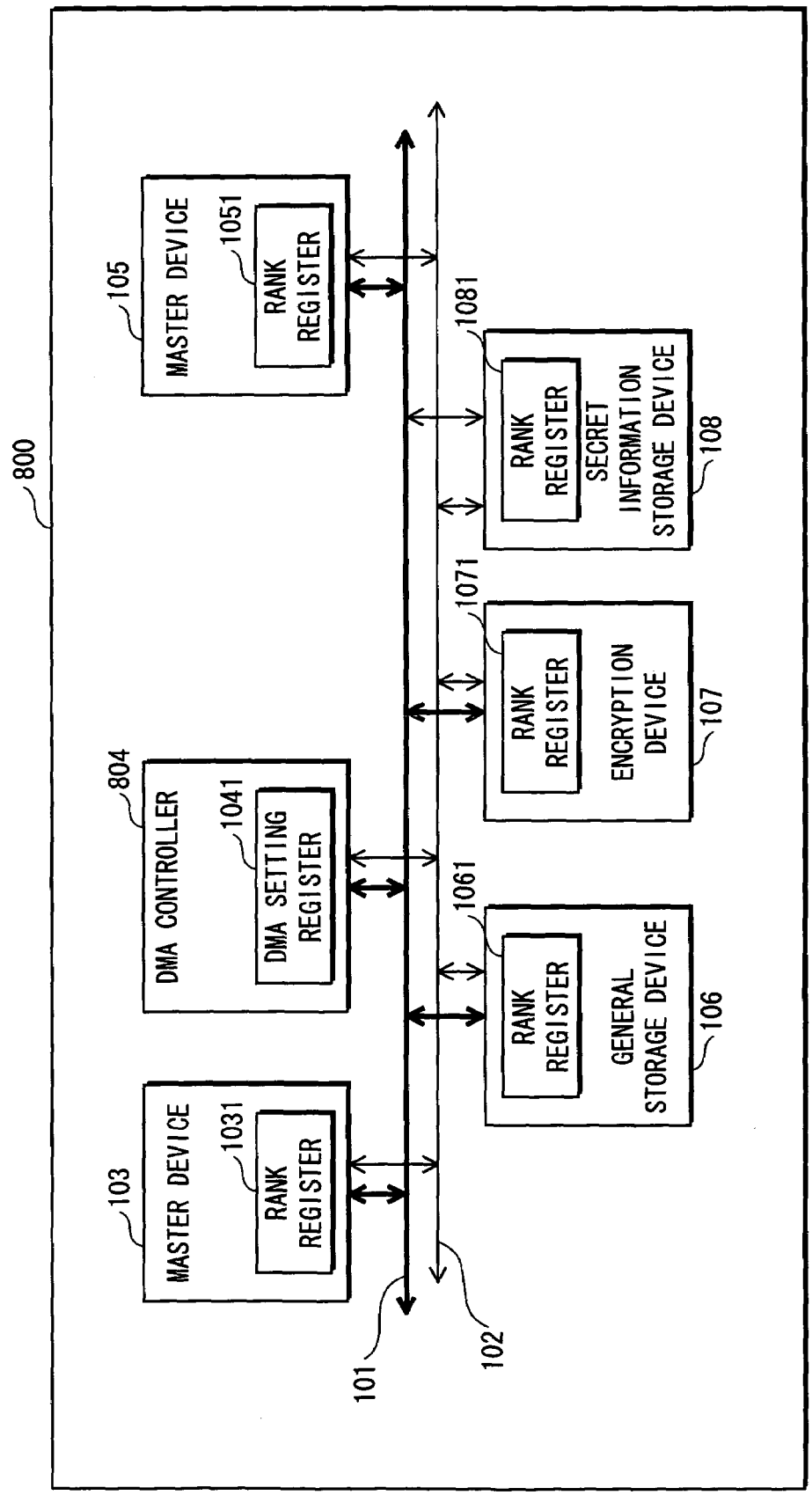
FIG. 19 is a functional block diagram showing a construction of a secret information processing apparatus to which an eighth embodiment of the present invention relates.

FIG. 19 is a functional block diagram showing a construction of a secret information processing apparatus 800 to which an eighth embodiment of the present invention relates.

As shown in the drawing, the secret information processing apparatus 800 is roughly made up of devices that include the data/address bus 101, the rank bus 102, the master device 103, a DMA controller 804, the master device 105, the general storage device 106, the encryption device 107, and the secret information storage device 108.

In FIG. 19, construction elements which are the same as those in the secret information processing apparatus 100 in the first embodiment have been given the same reference numerals and their explanation has been omitted. The following describes the differences from the first embodiment.

Note here that the secret information processing apparatus 800 may be connected to an external device via an external interface.

The DMA controller 804 includes the DMA setting register 1041, and exercises the following data transfer control operation H in response to a data transfer request from any of the master devices 103 and 105.

(1) Preprocessing

The DMA controller 804 stores a data transfer condition contained in the data transfer request in the DMA setting register 1041, thereby setting the data transfer condition in the DMA setting register 1041. The DMA controller 804 also obtains control of the data/address bus 101 from the master device, and instructs the master device to send a rank of the master device to source and destination slave devices specified by the data transfer condition.

(2) Data Transfer

The DMA controller 804 performs the same data transfer process as the DMA controller 104 in the first embodiment.

(3) Transfer Interrupt

The DMA controller 804 performs the same transfer interrupt process as the DMA controller 104 in the first embodiment, except that the DMA controller 804 does not set the rank setting register 1042 to the lower rank limit.

<Operation>

A data transfer operation H performed by the secret information processing apparatus 800 is described below.

Figure 20:
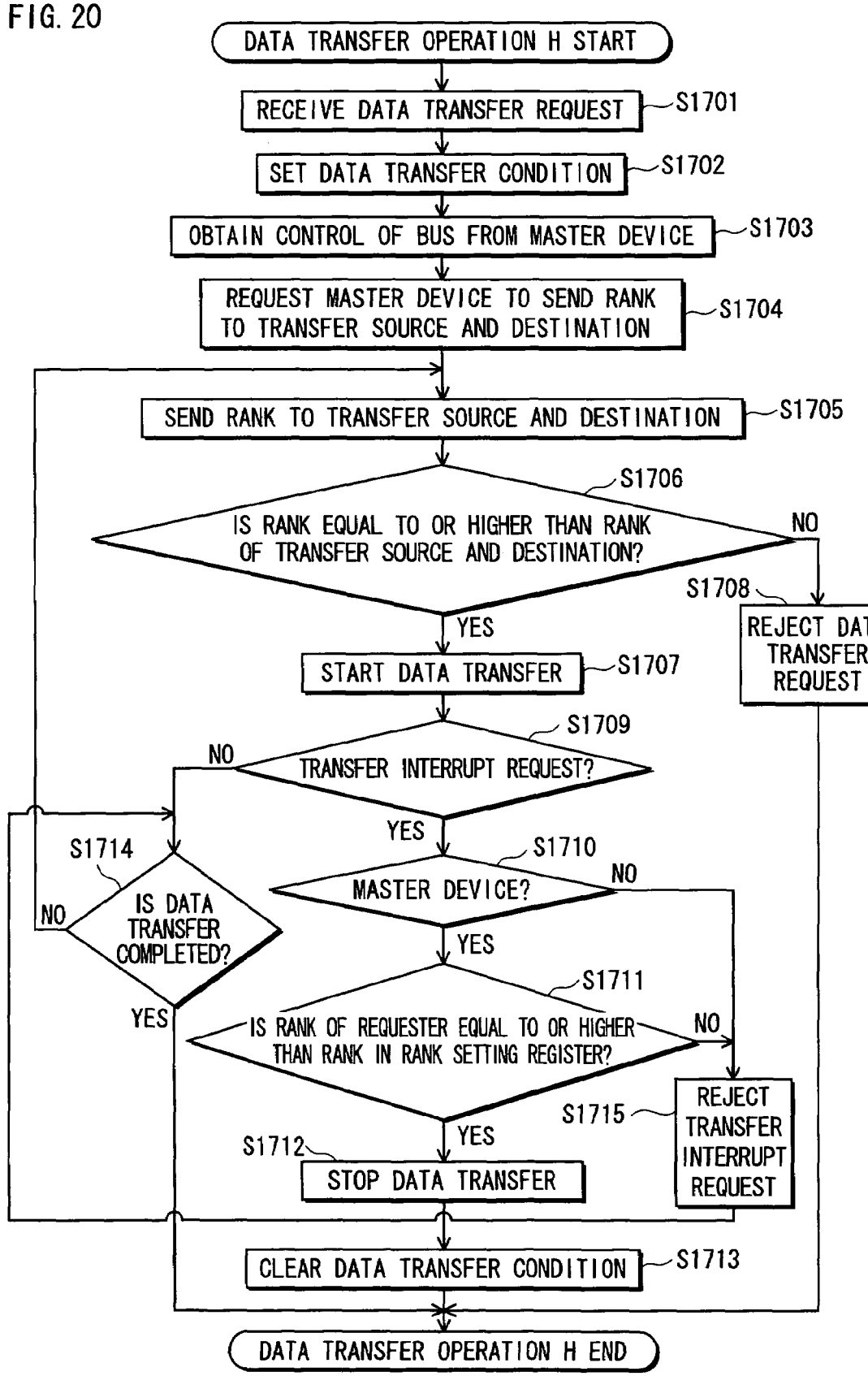
FIG. 20 is a flowchart showing a data transfer operation H performed by the secret information processing apparatus in the eighth embodiment.

FIG. 20 is a flowchart showing the data transfer operation H.

Upon receiving a data transfer request from any of the master devices 103 and 105 (step S1701), the DMA controller 804 stores a data transfer condition contained in the data transfer request in the DMA setting register 1041, thereby setting the data transfer condition in the DMA setting register 1041 (step S1702). The DMA controller 804 requests the master device to free the data/address bus 101, to obtain control of the data/address bus 101 from the master device (step S1703). The DMA controller 804 also requests the master device to send a rank of the master device to source and destination slave devices specified by the data transfer condition (step S1704). The master device accordingly sends the rank to the source and destination slave devices, to request access to the slave devices (step S1705).

Steps S1706 to S1715 which follow step S1706 are the same as steps S207 to S214, S216, and S217 shown in FIG. 2, so that their explanation has been omitted here.

<Modifications>

Although the present invention has been described by way of the first to eighth embodiments, it should be obvious that the present invention is not limited to the above. Example modifications are given below.

(1) The second embodiment may be modified as follows. If the judgment is negative in step S503 shown in FIG. 5, a highest rank in the slave device table is specified (step S1801), and then the operation advances to step S506.

Here, a predetermined rank may be used as the highest rank.

Figure 21:
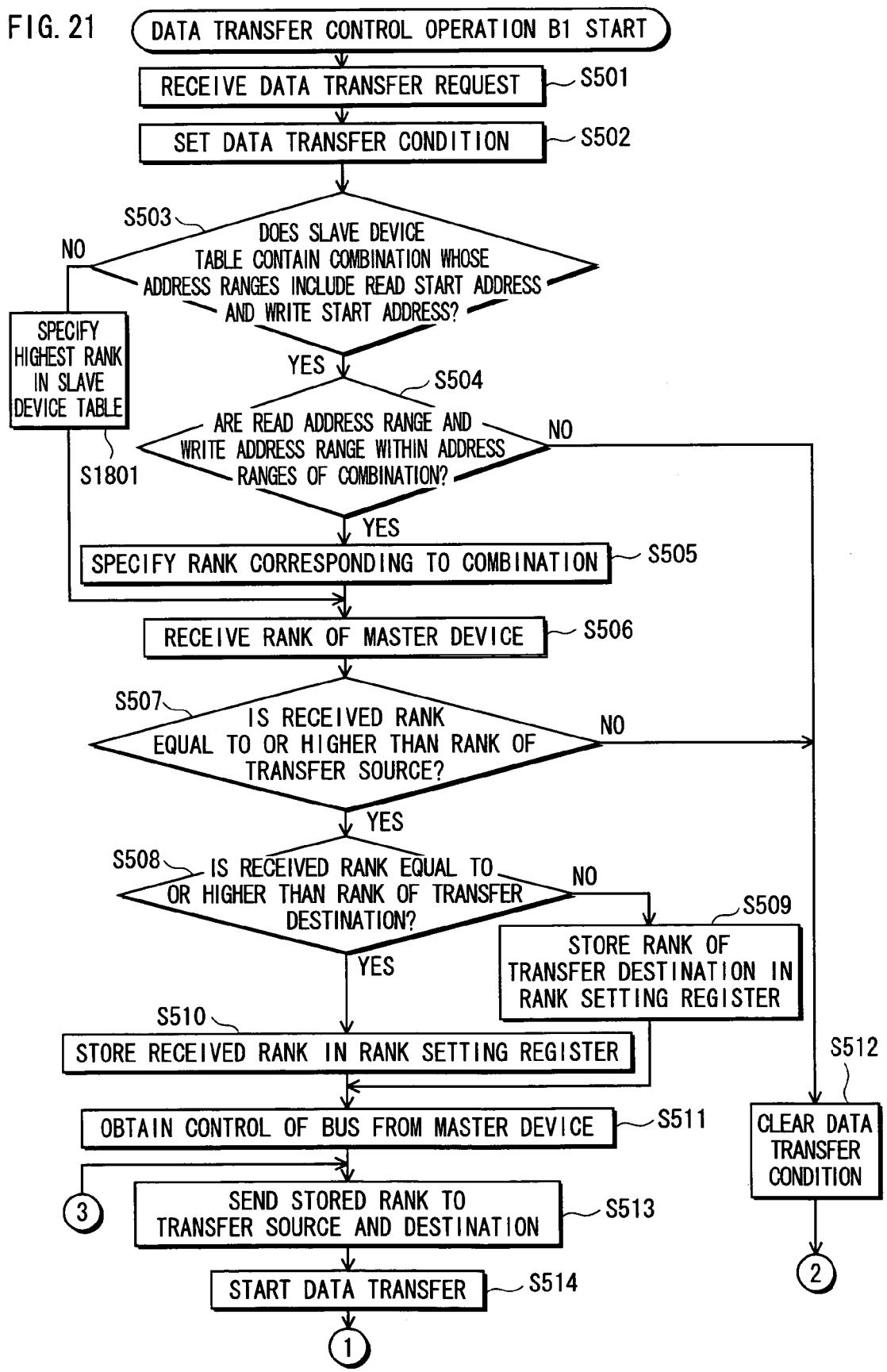
FIG. 21 is a flowchart showing one part of a data transfer control operation B1 as a modification to the data transfer control operation B performed by the DMA controller in the second embodiment.
Figure 22:
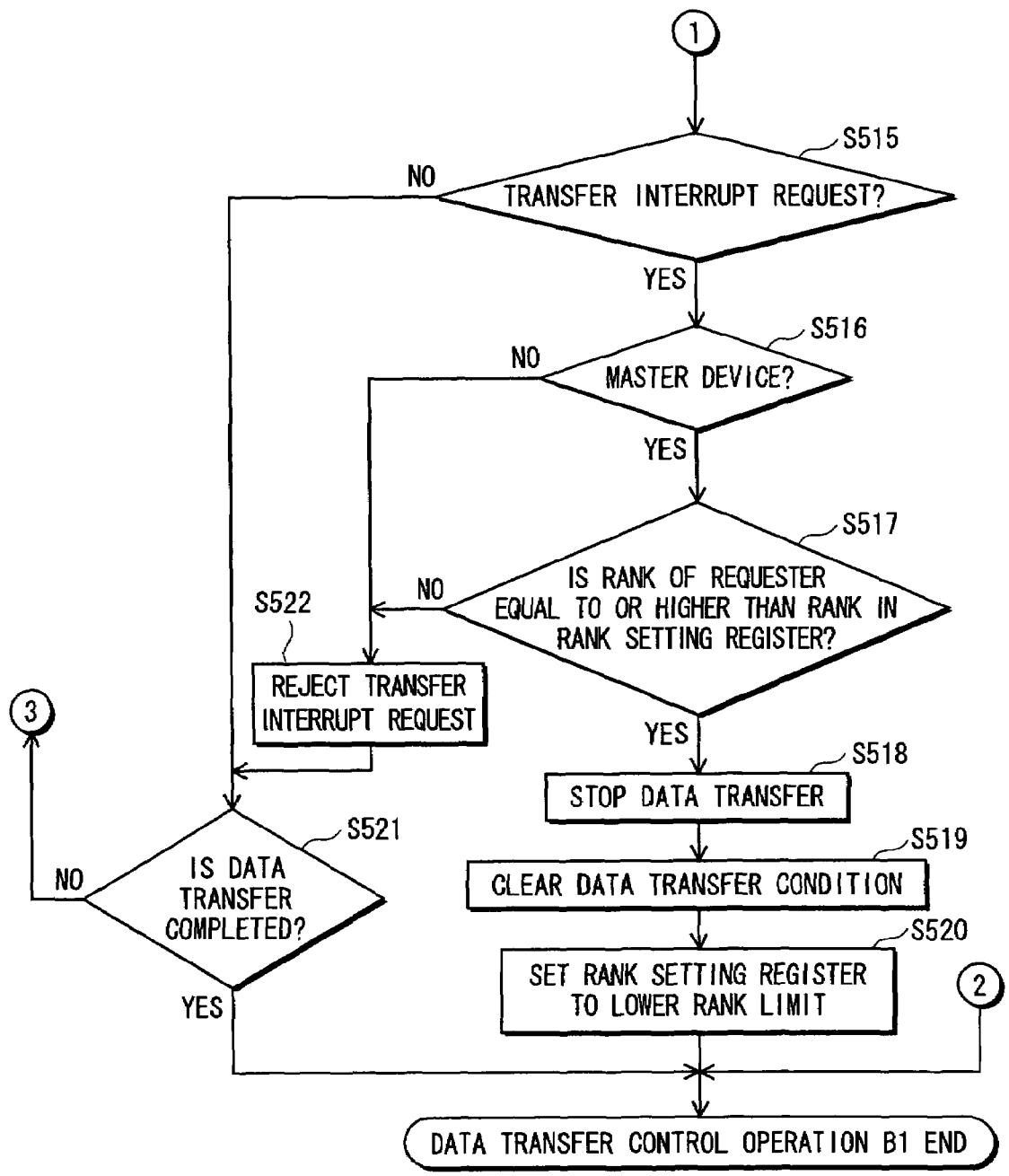
FIG. 22 is a flowchart showing the other part of the data transfer control operation B1.

FIGS. 21 and 22 are flowcharts showing a data transfer control operation B1 performed by the DMA controller 204 according to this modification.

(2) Also, the second embodiment may be modified as follows. A predetermined rank (e.g. a rank no lower than a rank of any slave device) is stored in the rank setting register 1042, in advance. In FIG. 5, step S510 is omitted, and step S513 is modified so as to send the predetermined rank or the rank of the destination slave device stored in the rank setting register 1042 to the source and destination slave devices to request access to the slave devices (step S1901).

Figure 23:
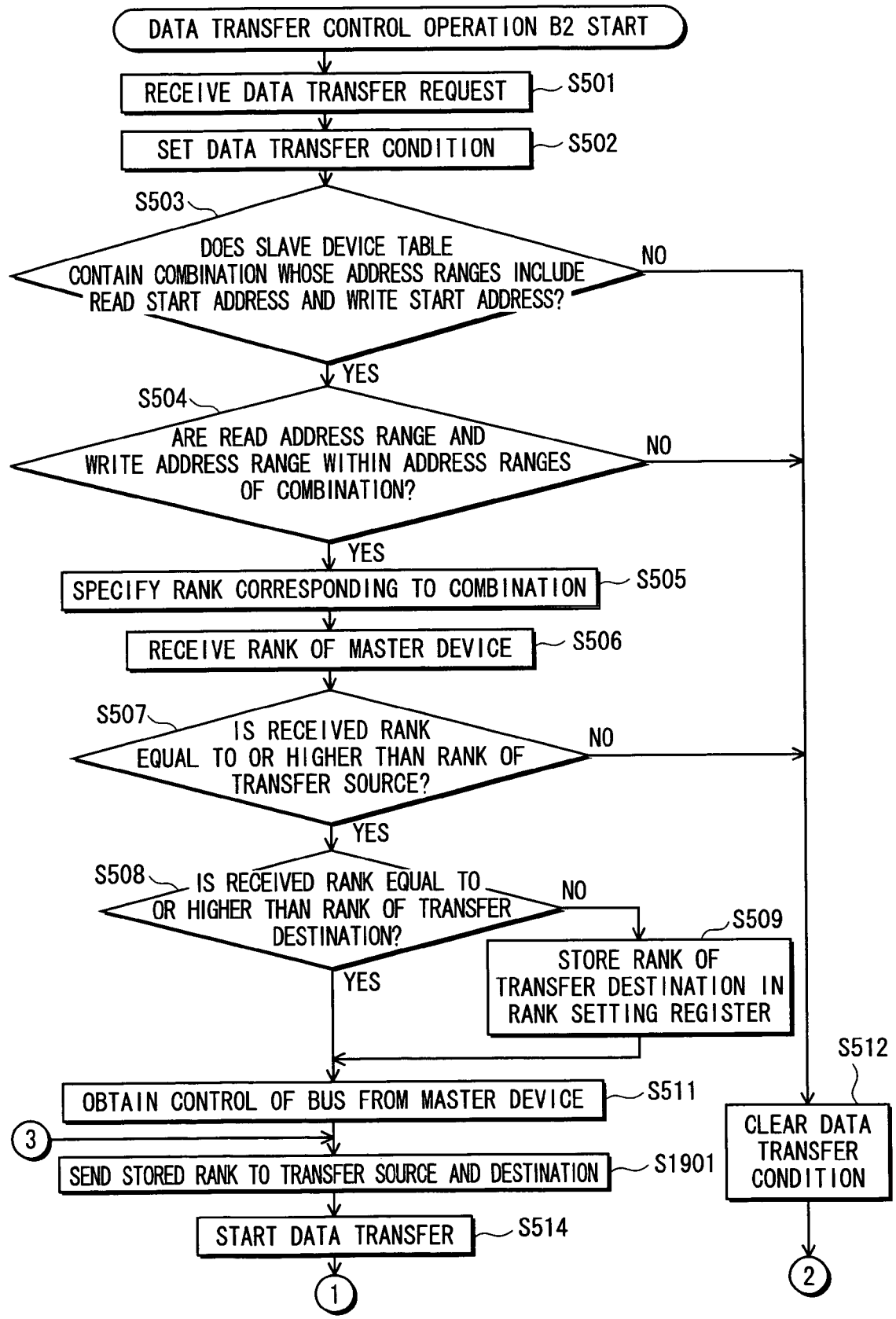
FIG. 23 is a flowchart showing one part of a data transfer control operation B2 as a modification to the data transfer control operation B performed by the DMA controller in the second embodiment.
Figure 24:
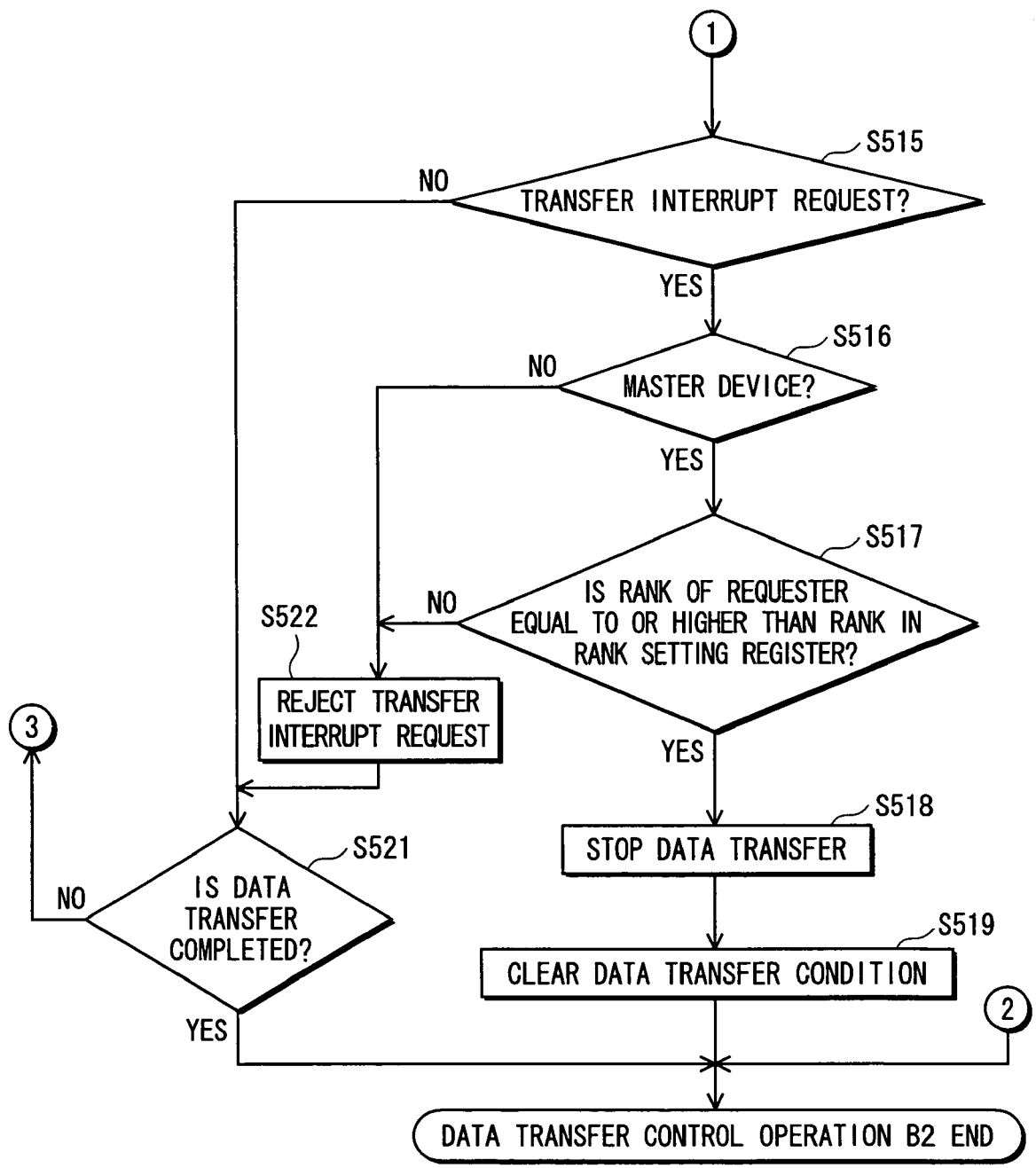
FIG. 24 is a flowchart showing the other part of the data transfer control operation B2.

FIGS. 23 and 24 are flowcharts showing a data transfer control operation B2 performed by the DMA controller 204 according to this modification.

(3) Also, the second embodiment may be modified as follows. The slave device table is modified so as to show, for each possible combination of slave devices as a transfer source and a transfer destination, a higher one of the ranks of the slave devices. In FIG. 5, steps S507 and S508 are replaced with a step of judging whether the rank of the master device is no lower than a rank corresponding to the source and destination slave devices specified by the data transfer condition, in the slave device table. If the rank of the master device is no lower than the rank corresponding to the source and destination slave devices in the slave device table, the operation advances to step S510.

In so doing, the judgment on whether the data transfer requested by the master device is permitted or not can be made with a smaller number of steps. This eases the operation of the DMA controller 204.

(4) The third embodiment may be modified as follows. The upper rank limit used in the seventh embodiment is stored in the rank setting register 1042, in advance. In FIG. 8, step S710 is omitted, and step S716 is modified so as to judge whether the rank of the master device which has made the transfer interrupt request is no lower than the upper rank limit stored in the rank setting register 1042 (step S2001).

Figure 25:
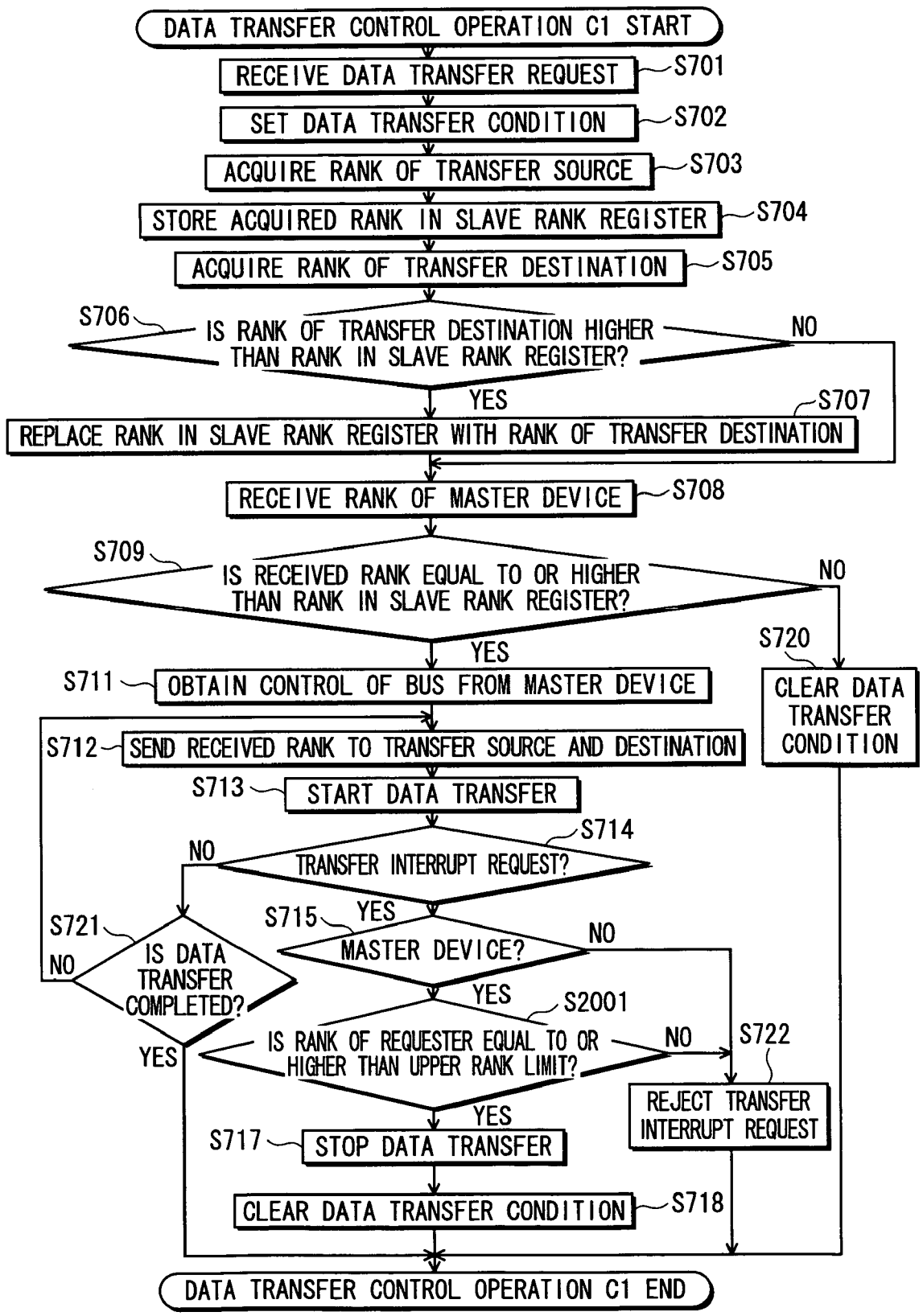
FIG. 25 is a flowchart showing a data transfer control operation C1 as a modification to the data transfer control operation C performed by the DMA controller in the third embodiment.

FIG. 25 is a flowchart showing a data transfer control operation C1 performed by the DMA controller 304 according to this modification.

(5) The fifth embodiment may be modified as follows. A predetermined rank (e.g. a rank no lower than a rank of any slave device) is stored in the rank setting register 1042, in advance. In FIG. 13, steps S1106 and S1107 are omitted, and step S1109 is modified so as to send the predetermined rank stored in the rank setting register 1042 to the source and destination slave devices to request access to the slave devices (step S2101). If the judgment in step S1103 is negative (step S1103: NO), the DMA controller 504 terminates the operation.

Figure 26:
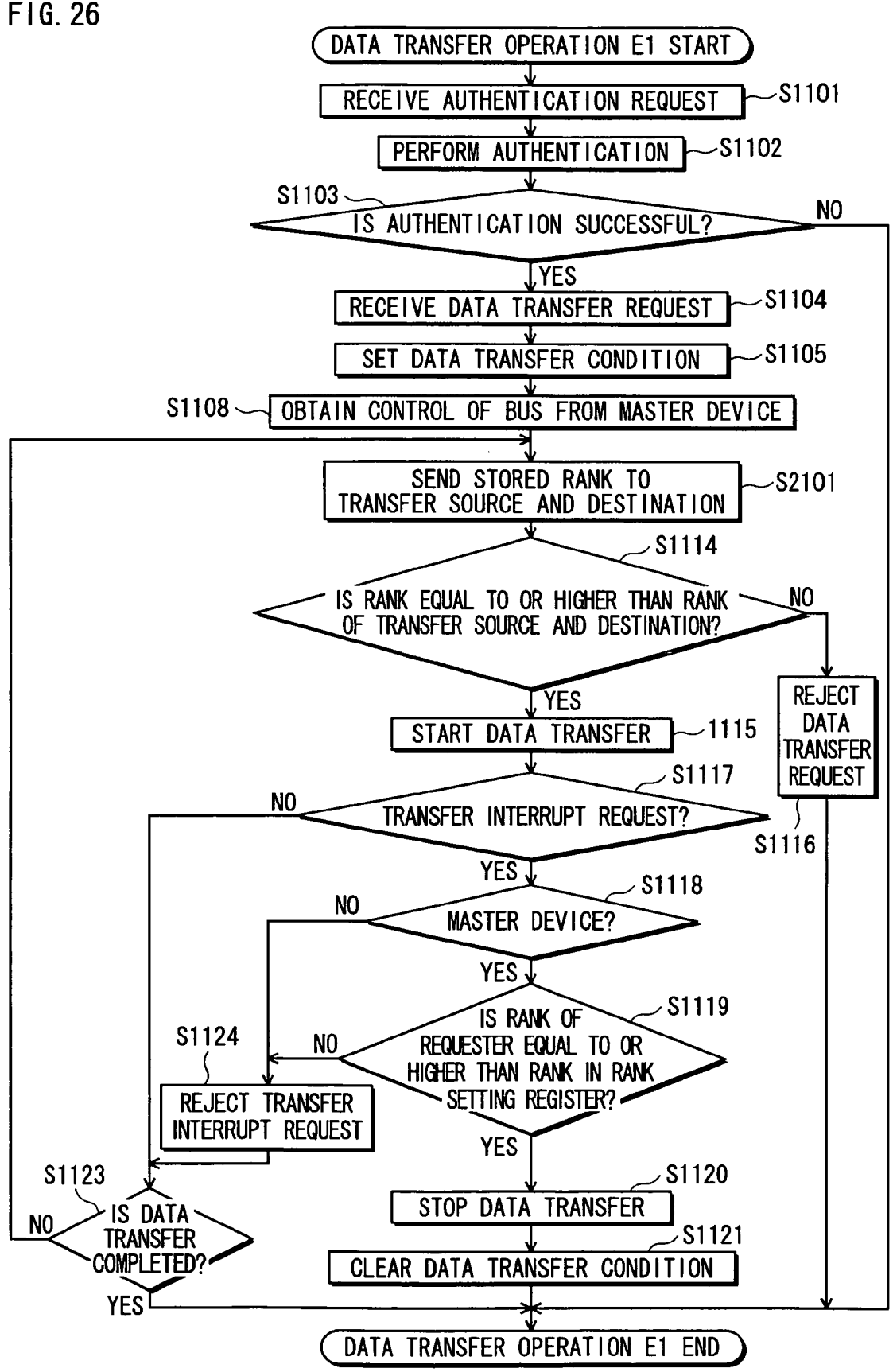
FIG. 26 is a flowchart showing a data transfer operation E1 as a modification to the data transfer operation E performed by the secret information processing apparatus in the fifth embodiment.

FIG. 26 is a flowchart showing a data transfer operation E1 performed by the secret information processing apparatus 500 according to this modification.

(6) The seventh embodiment may be modified as follows. In FIG. 17, if the judgment in step S1514 is negative (step S1514: NO), instead of rejecting the transfer interrupt request (step S1519), the DMA controller 704 stops the data transfer (step S1516), and sets the rank setting register 1042 to the upper rank limit stored in the upper rank limit register 7041 (step S1517). If the data transfer is completed (step S1518: YES), instead of performing step S1520, the DMA controller 704 erases the data transfer condition in the DMA setting register 1041 (step S2201), and sets the rank setting register 1042 to the lower rank limit stored in the lower rank limit register 1043 (step S2202).

Figure 27:
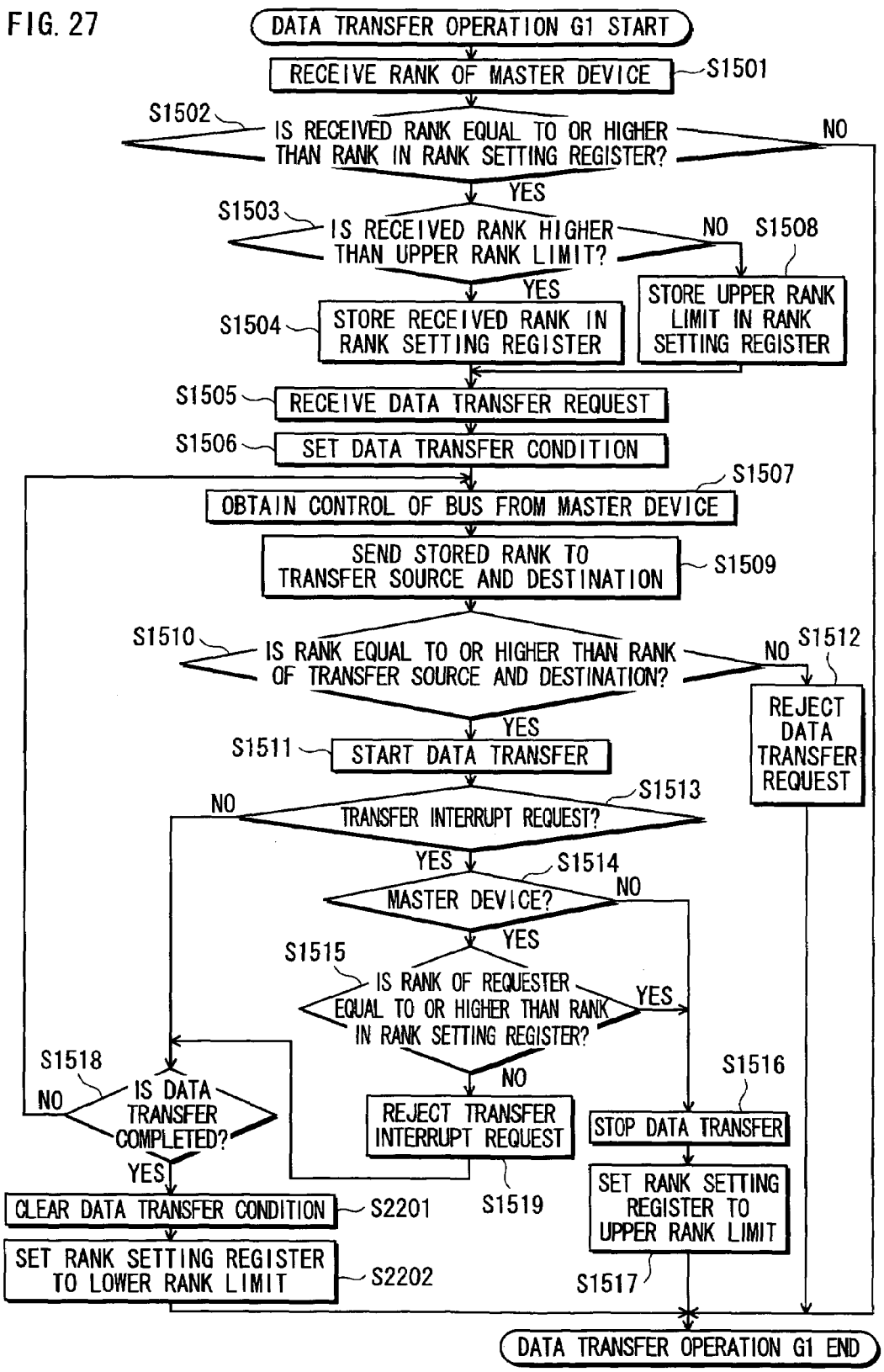
FIG. 27 is a flowchart showing a modification (a data transfer operation G1) to the data transfer operation G performed by the secret information processing apparatus in the seventh embodiment.

FIG. 27 is a flowchart showing a data transfer operation G1 performed by the secret information processing apparatus 700 according to this modification.

(7) The data transfer control performed by the DMA controller in the first to eighth embodiments may be applied to data transfer control within one slave device. Also, the number of slave devices may be two or more.

(8) Though the first to eighth embodiments describe the case where the number of master devices is two, the number of master devices may be one, or more than two.

(9) In the first to eighth embodiments, the DMA controller may have one channel or a plurality of channels. Also, the DMA controller may have the same number of DMA setting registers and the same number of rank setting registers as channels, or the DMA setting register and the rank setting register may be shared between the channels.

(10) In the first to eighth embodiments, a rank of each device in the secret information processing apparatus may be fixed or variable.

(11) In the first to eighth embodiments, each device in the secret information processing apparatus may be realized by an individual LSI (semiconductor integrated circuit), or any combination of devices and buses may be realized by a single LSI.

(12) The first to eighth embodiments describe the case where the rank bus 102 is used to transfer a rank between devices, but the rank may instead be transferred using the data/address bus 101.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A DMA controller connected by a bus to a master device and a plurality of slave devices, and for performing a data transfer between slave devices which are specified, from among the plurality of slave devices, as a source and a destination of the data transfer by a transfer condition received from the master device, each of the master device and the plurality of slave devices having a rank used for judging data transfer permissibility, the DMA controller comprising
a data transfer control unit operable to enable the data transfer if the data transfer is judged to be permitted as a result of a comparison between a rank of the master device and a rank of any of the specified slave devices, and disable the data transfer if the data transfer is judged to be prohibited.

2. The DMA controller of claim 1,
wherein the data transfer control unit includes:
a table storage unit storing a slave device table showing, for each possible combination of slave devices as a source and a destination of a data transfer, a higher one of ranks of the slave devices;
a comparison unit operable to compare the rank of the master device with a rank corresponding to a combination of the specified slave devices in the slave device table; and
a transfer permissibility judgment unit operable to judge whether the data transfer is permitted or prohibited, based on a result of the comparison by the comparison unit.

3. The DMA controller of claim 2,
wherein the data transfer control unit further includes
a table judgment unit operable to judge whether the combination of the specified slave devices is included in the slave device table, and
the transfer permissibility judgment unit judges the data transfer to be prohibited, if the combination of the specified slave devices is not included in the slave device table.

4. The DMA controller of claim 1,
wherein the data transfer control unit includes:
an acquisition unit operable to acquire a rank of each of the specified slave devices, from the slave device;

a comparison unit operable to compare the rank of the master device with the acquired rank; and
a transfer permissibility judgment unit operable to judge whether the data transfer is permitted or prohibited, based on a result of the comparison by the comparison unit.

5. The DMA controller of claim 2,
wherein each of the specified slave devices judges whether to permit access to the slave device, based on a result of a comparison between the rank of the master device received from the DMA controller and a rank of the slave device,
the data transfer control unit further includes
a request unit operable to send the rank of the master device to the slave device, to request access to the slave device, and
the transfer permissibility judgment unit judges whether the data transfer is permitted or prohibited, based on the result of the comparison by the comparison unit and a result of the judgment by the slave device.

6. The DMA controller of claim 1, connected by the bus to a plurality of master devices including the master device,
wherein the data transfer control unit includes:
a flag storage unit storing a flag that shows a state of the DMA controller as any of a data transferable state and a data intransferable state; and
a flag setting unit operable to set the flag to show the data intransferable state during data transferring, and to show the data transferable state not during data transferring, and
the data transfer control unit disables the data transfer, if the flag shows the data intransferable state upon receiving the transfer condition from the master device.

7. The DMA controller of claim 6,
wherein the data transfer control unit further includes:
a master device storage unit operable to, if the transfer condition is received from the master device while the flag shows the data transferable state, store an identifier of the master device; and
a master device judgment unit operable to, if the transfer condition is received from the master device while the flag shows the data intransferable state, judge whether the identifier of the master device is stored in the master device storage unit, and
the data transfer control unit disables the data transfer, if the flag shows the data intransferable state upon receiving the transfer condition from the master device and the identifier of the master device is not stored in the master device storage unit.

8. The DMA controller of claim 1, connected by the bus to a plurality of master devices including the master device,
wherein the data transfer control unit includes:
an interrupt request reception unit operable to, when a transfer interrupt request is sent from any of the plurality of master devices and the plurality of slave devices during the data transfer, receive the transfer interrupt request;
a requester judgment unit operable to judge whether a sender of the transfer interrupt request is one of the plurality of master devices;
an interrupt judgment unit operable to, if the sender of the transfer interrupt request is one of the plurality of master devices, receive a rank of the sender of the transfer interrupt request, and judge whether to stop the data transfer, based on a result of a comparison between the rank of the sender of the transfer interrupt request and the rank of the master device; and a transfer stop unit operable to stop the data transfer if the interrupt judgment unit judges that the data transfer is to be stopped.

9. The DMA controller of claim 8, further comprising:
a lower rank limit storage unit storing a predetermined lower rank limit;
a rank storage unit operable to receive the rank of the master device from the master device, and store the received rank; and
a condition storage unit operable to store the transfer condition,
wherein the data transfer is judged to be permitted if the rank stored in the rank storage unit is no lower than the rank of any of the specified slave devices, and judged to be prohibited if the rank stored in the rank storage unit is lower than the rank of any of the specified slave devices,
the interrupt judgment unit judges that the data transfer is to be stopped, if the rank of the sender of the transfer interrupt request is no lower than the rank stored in the rank storage unit, and
the data transfer control unit further includes:
an erase unit operable to erase the transfer condition in the condition storage unit, if the interrupt judgment unit judges that the data transfer is to be stopped; and
a replace unit operable to replace the rank in the rank storage unit with the lower rank limit, if the interrupt judgment unit judges that the data transfer is to be stopped.

10. The DMA controller of claim 1,
wherein the data transfer is judged to be permitted if the rank of the master device is no lower than the rank of any of the specified slave devices, and judged to be prohibited if the rank of the master device is lower than the rank of any of the specified slave devices,
the data transfer control unit includes:
an upper rank limit storage unit storing a predetermined upper rank limit; and
a comparison unit operable to compare the rank of the master device with the upper rank limit, and
the data transfer control unit enables the data transfer, if the rank of the master device is no higher than the upper rank limit and the data transfer is judged to be permitted, or if the rank of the master device is higher than the upper rank limit and the upper rank limit is no lower than the rank of any of the specified slave devices.

11. The DMA controller of claim 10, connected by the bus to a plurality of master devices including the master device,
wherein the data transfer control unit further includes
a rank storage unit operable to store the rank of the master device if the rank of the master device is no higher than the upper rank limit, and store the upper rank limit if the rank of the master device is higher than the upper rank limit, and
the data transfer control unit disables a data transfer requested by any master device whose rank is lower than the rank stored in the rank storage unit.

12. The DMA controller of claim 11,
wherein the data transfer control unit further includes:
an interrupt request reception unit operable to, when a transfer interrupt request is sent from any of the plurality of master devices and the plurality of slave devices during the data transfer, receive the transfer interrupt request;
a requester judgment unit operable to judge whether a sender of the transfer interrupt request is one of the plurality of master devices;

an interrupt judgment unit operable to, if the sender of the transfer interrupt request is one of the plurality of master devices, receive a rank of the sender of the transfer interrupt request, and judge whether to stop the data transfer, based on a result of a comparison between the rank of the sender of the transfer interrupt request and the rank stored in the rank storage unit; and a transfer stop unit operable to stop the data transfer if the interrupt judgment unit judges that the data transfer is to be stopped.

13. The DMA controller of claim 12, further comprising a condition storage unit operable to store the transfer condition, wherein the interrupt judgment unit judges that the data transfer is to be stopped, if the rank of the sender of the transfer interrupt request is no lower than the rank stored in the rank storage unit, and the data transfer control unit further includes:

an erase unit operable to erase the transfer condition in the condition storage unit, if the interrupt judgment unit judges that the data transfer is to be stopped; and a replace unit operable to replace the rank in the rank storage unit with the upper rank limit, if the interrupt judgment unit judges that the data transfer is to be stopped.

14. The DMA controller of claim 13, further comprising a lower rank limit storage unit storing a lower rank limit which is no higher than a rank of any of the plurality of master devices and the plurality of slave devices, wherein the erase unit erases the transfer condition in the condition storage unit, when the data transfer is completed, and the replace unit replaces the rank in the rank storage unit with the lower rank limit, when the data transfer is completed.

15. The DMA controller of claim 2, wherein each of the specified slave devices permits access to the slave device, if a rank received from the DMA controller is no lower than a rank of the slave device, the data transfer control unit further includes:

a rank storage unit storing an upper rank limit which is no lower than a rank of any of the plurality of slave devices;

a condition storage unit operable to store the transfer condition; and a request unit operable to send the upper rank limit to the slave device, to request access to the slave device, and the transfer permissibility judgment unit judges whether the data transfer is permitted or prohibited, based on the result of the comparison by the comparison unit and if the slave device permits access to the slave device.

16. The DMA controller of claim 15, connected by the bus to a plurality of master devices including the master device, wherein the data transfer control unit further includes:

an interrupt request reception unit operable to, when a transfer interrupt request is sent from any of the plurality of master devices and the plurality of slave devices during the data transfer, receive the transfer interrupt request;

a requester judgment unit operable to judge whether a sender of the transfer interrupt request is one of the plurality of master devices;

an interrupt judgment unit operable to, if the sender of the transfer interrupt request is one of the plurality of master devices, receive a rank of the sender of the transfer interrupt request, and judge whether to stop the data transfer, based on a result of a comparison between the rank of the sender of the transfer interrupt request and the upper rank limit stored in the rank storage unit; and a transfer stop unit operable to stop the data transfer, if the interrupt judgment unit judges that the data transfer is to be stopped.

17. The DMA controller of claim 16, wherein the data transfer control unit further includes an erase unit operable to erase the transfer condition in the condition storage unit, if the interrupt judgment unit judges that the data transfer is to be stopped.

18. The DMA controller of claim 1, wherein the data transfer control unit includes:

an authentication unit operable to perform authentication on the master device, in response to an authentication request from the master device; and a lower rank limit storage unit storing a lower rank limit which is no higher than a rank of any of the master device and the plurality of slave devices, and the data transfer control unit enables the data transfer, if the authentication is successful and the data transfer is judged to be permitted, or if the authentication is unsuccessful and the lower rank limit is no lower than the rank of any of the specified slave devices.

19. The DMA controller of claim 18, connected by the bus to a plurality of master devices including the master device, and further comprising a rank storage unit operable to store the rank of the master device if the authentication is successful, and store the lower rank limit if the authentication is unsuccessful, wherein the data transfer control unit further includes:

an interrupt request reception unit operable to, when a transfer interrupt request is sent from any of the plurality of master devices and the plurality of slave devices during the data transfer, receive the transfer interrupt request;

a requester judgment unit operable to judge whether a sender of the transfer interrupt request is one of the plurality of master devices;

an interrupt judgment unit operable to, if the sender of the transfer interrupt request is one of the plurality of master devices, receive a rank of the sender of the transfer interrupt request, and judge whether to stop the data transfer, based on a result of a comparison between the rank of the sender of the transfer interrupt request and the rank stored in the rank storage unit; and a transfer stop unit operable to stop the data transfer if the interrupt judgment unit judges that the data transfer is to be stopped.

20. The DMA controller of claim 19, further comprising a condition storage unit operable to store the transfer condition, wherein the data transfer is judged to be permitted if the rank stored in the rank storage unit is no lower than the rank of any of the specified slave devices, and judged to be prohibited if the rank stored in the rank storage unit is lower than the rank of any of the specified slave devices, the interrupt judgment unit judges that the data transfer is to be stopped, if the rank of the sender of the transfer interrupt request is no lower than the rank stored in the rank storage unit, and the data transfer control unit further includes:

an erase unit operable to erase the transfer condition in the condition storage unit, if the interrupt judgment unit judges that the data transfer is to be stopped; and a replace unit operable to replace the rank in the rank storage unit with the lower rank limit, if the interrupt judgment unit judges that the data transfer is to be stopped.

21. The DMA controller of claim 1, wherein the data transfer control unit includes:

a table storage unit storing a slave device table showing, for each possible combination of slave devices as a source and a destination of a data transfer, ranks of the slave devices;

a comparison unit operable to compare the rank of the master device with each rank corresponding to a combination of the specified slave devices in the slave device table; and a transfer permissibility judgment unit operable to judge whether the data transfer is permitted or prohibited, based on a result of the comparison by the comparison unit.

22. The DMA controller of claim 1, wherein each of the specified slave devices judges whether to permit access to the slave device, based on a result of a comparison between the rank of the master device received from the DMA controller and a rank of the slave device, and the data transfer control unit includes:

a request unit operable to send the rank of the master device to the slave device, to request access to the slave device; and a transfer permissibility judgment unit operable to judge whether the data transfer is permitted or prohibited, based on a result of the judgment by the slave device.

23. A DMA controller connected by a bus to a master device and a plurality of slave devices, and for performing a data transfer between slave devices which are specified, from among the plurality of slave devices, as a source and a destination of the data transfer by a transfer condition received from the master device, the DMA controller comprising:

an authentication unit operable to perform authentication on the master device, in response to an authentication request from the master device; and a data transfer control unit operable to enable the data transfer if the authentication is successful.

24. The DMA controller of claim 23, further comprising an invalid master device storage unit operable to store an identifier of the master device, if the authentication is unsuccessful, wherein the authentication unit performs the authentication, if the identifier of the master device is not stored in the invalid master device storage unit.

25. A data transfer control method used in a DMA controller that is connected by a bus to a master device and a plurality of slave devices and is for performing a data transfer between slave devices which are specified, from among the plurality of slave devices, as a source and a destination of the data transfer by a transfer condition received from the master device, the master device and the plurality of slave devices each having a rank used for judging accessibility, each of the specified slave devices judging whether to permit access to the slave device based on a result of a comparison between a rank of the master device and a rank of the slave device, and the DMA controller including a condition storage unit, the data transfer control method comprising the steps of:

storing the transfer condition in the condition storage unit;

instructing the master device to send the rank of the master device to the slave device, to request access to the slave device; and enabling the data transfer if the slave device permits access to the slave device.

26. A data transfer control method used in a DMA controller that is connected by a bus to a master device and a plurality of slave devices and is for performing a data transfer between slave devices which are specified, from among the plurality of slave devices, as a source and a destination of the data transfer by a transfer condition received from the master device, the master device and the plurality of slave devices each having a rank used for judging data transfer permissibility, and each of the specified slave devices judging whether to permit access to the slave device based on a result of a comparison between a rank of the master device and a rank of the slave device, the data transfer control method comprising the steps of:

sending the rank of the master device to the slave device, to request access to the slave device; and judging whether the data transfer is permitted or prohibited based on a result of the judgment by the slave device, and enabling the data transfer if the data transfer is judged to be permitted and disabling the data transfer if the data transfer is judged to be prohibited.

* * * * *